(12) United States Patent
Wang et al.

(10) Patent No.: US 7,830,297 B1
(45) Date of Patent: Nov. 9, 2010

(54) SYSTEM AND METHOD FOR DETECTING AND DE-INTERLEAVING RADAR EMITTERS USING SNAPSHOTS OF VARYING LENGTHS

(75) Inventors: Paul C. Wang, Ridgewood, NJ (US); Matthew Orr, Chester, NY (US); Mitchell Sparrow, Wayne, NJ (US); Martin Apa, Wayne, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 494 days.

(21) Appl. No.: 11/960,872

(22) Filed: Dec. 20, 2007

(51) Int. Cl.
*G01S 7/40* (2006.01)
(52) U.S. Cl. ............................ 342/13; 342/90; 342/195
(58) Field of Classification Search ................... 342/13, 342/90, 95–97, 195, 40, 137
See application file for complete search history.

(56) References Cited

U.S. PATENT DOCUMENTS

| | | | |
|---|---|---|---|
| 4,679,050 A | 7/1987 | Bergman | |
| 4,721,958 A * | 1/1988 | Jenkin | 342/13 |
| 4,918,455 A * | 4/1990 | Maier | 342/13 |
| 5,381,150 A | 1/1995 | Hawkins et al. | |
| 5,583,505 A * | 12/1996 | Andersen et al. | 342/13 |
| 6,163,297 A * | 12/2000 | Rose | 342/418 |
| 6,337,654 B1 | 1/2002 | Richardson et al. | |
| 6,437,728 B1 | 8/2002 | Richardson et al. | |
| 6,940,450 B2 | 9/2005 | Blunt et al. | |
| 6,985,102 B1 * | 1/2006 | Horn et al. | 342/13 |
| 7,019,692 B2 * | 3/2006 | Baugh et al. | 342/378 |
| 7,034,738 B1 * | 4/2006 | Wang et al. | 342/13 |
| 7,184,493 B1 * | 2/2007 | Pringle et al. | 375/316 |
| 7,397,415 B1 * | 7/2008 | Wang et al. | 342/13 |
| 7,411,539 B2 * | 8/2008 | Valand | 342/13 |
| 2005/0033789 A1 * | 2/2005 | Sirois | 708/422 |
| 2005/0128197 A1 | 6/2005 | Thrun et al. | |
| 2008/0192864 A1 * | 8/2008 | Szajnowski | 375/340 |
| 2009/0135052 A1 * | 5/2009 | Driggs et al. | 342/195 |

OTHER PUBLICATIONS

Iterative Self Organizing Data Analysis Techniques (ISODATA), by J. T. Tou and R. C. Gonzalez, Pattern Recognition Principles, Addison-Wesley, 1974, Chapter 3, pp. 75-109.

(Continued)

*Primary Examiner*—John B Sotomayor
(74) *Attorney, Agent, or Firm*—RatnerPrestia

(57) ABSTRACT

A method of classifying radar emitters includes the steps of: (a) receiving pulses from multiple radar emitters over a plurality of consecutive first time intervals; (b) identifying pulses in each of the plurality of consecutive first time intervals corresponding to one or more first pulse trains using a first algorithm and de-interleaving the identified pulses from the plurality of first time intervals; (c) associating received pulses not identified and de-interleaved using the first algorithm with a plurality of consecutive second time intervals; and (d) identifying further pulses in each of the plurality of consecutive second time intervals corresponding to one or more second pulse trains using a second algorithm different from the first algorithm and de-interleaving the identified further pulses from the pulses associated with the plurality of consecutive second time intervals. Each consecutive second time interval is formed from two or more consecutive first time intervals.

19 Claims, 27 Drawing Sheets

OTHER PUBLICATIONS

"The minimum description length criterion applied to emitter number detection and pulse classification" Liu J. et al., Statistical Signal and Array Processing, 1998, Proceedings, Ninth IEEE SP Workshop on Sep. 14-16, 1998 pp. 172-175.

"Fractal feature extraction of radar emitter signals", Gexiang Zhang et al., Environmental Electromagnetics, 2003, CEEM 2003, Proceedings Asia-Pacific Conference on Nov. 4-7, 2003 pp. 161-164.

"Complexity feature extraction of radar emitter signals", Gexiang Zhang et al. Environmental Electromagnetics, 2003, CEEM 2003, Proceeding, Asia-Pacific Conference on Nov. 4-7, 2003 pp. 495-498.

"Online Clustering Algorithms for Radar Emitter Classification", Jun Liu et al., Pattern Analysis and Machine Intelligence, IEEE Transactions on vol. 27, Issue 8, Aug. 2005, pp. 1185-1196.

* cited by examiner

SYSTEM AND METHOD FOR DETECTING AND DE-INTERLEAVING RADAR EMITTERS USING SNAPSHOTS OF VARYING LENGTHS

TECHNICAL FIELD

The present invention relates, in general, to radar identification. More specifically, the present invention relates to forming pulse descriptor words (PDWs) for pulses received from multiple radar emitters, storing the PDWs in snapshots of varying lengths, and processing the stored PDWs depending on the lengths of the snapshots in which the PDWs are stored to detect one or more pulse trains corresponding, respectively, to one or more radar emitters.

BACKGROUND

Radars emit a variety of signals that may characterize and identify them. Each radar may emit a specific pulse amplitude and a specific fixed radio frequency (RF) or a variable RF ranging over a fixed bandwidth. Each may emit a fixed pulse repetition frequency (PRF) or a fixed pulse repetition interval (PRI) and may be of a certain pulse width (PW).

A radar may also emit a fixed, dwell-switched PRI or a multiple-step, multiple-position staggered PRI. In addition, a radar may emit a pattern-type of PRI, such as a sawtooth, triangular, sinusoidal, jittered, or pseudo-random pattern.

An aircraft flying into a region with an onboard wideband receiver may detect a variety of signals emitted from multiple radars located in that region. Unless these signals are sorted and separated from each other, it is not possible for the aircraft to determine the types of classes of radars it is about to encounter. It does not know whether the radars are hostile and does not know whether the radars present a high or low threat to the incoming aircraft.

A need, therefore, exists for an aircraft to be able to sort and identify a variety of radars that are emitting energy towards the aircraft. The present invention addresses this need.

SUMMARY OF THE INVENTION

In one aspect, the invention includes a method of classifying radar emitters including the steps of: (a) receiving pulses from multiple radar emitters over a plurality of consecutive first time intervals; (b) identifying pulses in each of the plurality of consecutive first time intervals corresponding to one or more first pulse trains using a first algorithm and de-interleaving the identified pulses from the pulses received during each of the plurality of first time intervals; (c) associating received pulses not identified and de-interleaved using the first algorithm with a plurality of consecutive second time intervals; (d) identifying further pulses in each of the plurality of consecutive second time intervals corresponding to one or more second pulse trains using a second algorithm and de-interleaving the identified further pulses from the pulses associated with the plurality of consecutive second time intervals. Each of the consecutive second time intervals is formed from two or more of the consecutive first time intervals. The second algorithm is different from the first algorithm.

In a first exemplary embodiment, step (b) includes identifying a first train of pulses received from a first radar source during a first time interval in the plurality of consecutive first time intervals using the first algorithm; establishing a first tracking filter associated with the identified first train of pulses received from the first radar source; and de-interleaving the identified first train of pulses from the received pulses in the first time interval.

In a further exemplary embodiment building upon the first exemplary embodiment discussed above, the method further includes identifying a second train of pulses received during a second time interval in the plurality of consecutive first time intervals using the tracking filter and de-interleaving the identified second train of pulses from the pulses received during the second time interval. The second time interval follows the first time interval in time, and the identified second train of pulses is produced by the first radar source.

In another exemplary embodiment building upon the further exemplary embodiment described above, the method further includes identifying a further train of pulses received from a second radar source during the second time interval using the first algorithm; establishing a further tracking filter associated with the identified further train of pulses received from the second radar source; and de-interleaving the identified further train of pulses received from the second radar source from the pulses received during the second time interval and remaining after the second train of pulses produced by the first radar source is removed.

In yet another exemplary embodiment, the method further includes the steps of: (e) associating pulses in the plurality of consecutive second time intervals not identified and de-interleaved using the second algorithm with a plurality of consecutive third time intervals; and (f) identifying still further pulses in each of the plurality of consecutive third time intervals corresponding to one or more third pulse trains using a third algorithm and de-interleaving the identified still further pulses from the pulses associated with the plurality of consecutive third time intervals. Each consecutive third time interval is formed from two or more consecutive second time intervals, and the third algorithm is different from the first algorithm.

In another aspect, the invention includes a method of classifying radar emitters including the steps of (a) receiving pulses from multiple radar emitters over a plurality of consecutive first time intervals; (b) forming a first snapshot of pulse descriptor words (PDWs) for the pulses received in a first time interval in the plurality of consecutive first time intervals; (c) identifying PDWs corresponding to one or more pulse trains in the first snapshot using a first algorithm and removing the identified PDWs from the first snapshot; (d) forming a second snapshot from the PDWs remaining in the first snapshot; and (e) identifying further PDWs corresponding to one or more pulse trains in the second snapshot using a second algorithm and removing the identified further PDWs from the second snapshot. The second time interval is longer than the first time interval. The second algorithm is different from the first algorithm.

In an exemplary embodiment of the other aspect, the method further includes (f) forming a third snapshot from the PDWs remaining in the second snapshot; and (g) identifying still further PDWs corresponding to one or more pulse trains in the third snapshot using a third algorithm and removing the identified still further PDWs from the third snapshot. The third snapshot corresponds to a third time interval longer than the second time interval. The third algorithm is different from the first algorithm.

In still another aspect, the invention includes a system for classifying radar emitters. This system includes a receiver for receiving a plurality of signals from radar emitters and a processor coupled to the receiver. The processor is configured for (a) generating data components for each signal received from the radar emitters, (b) forming multi-dimensional samples from the generated data components, (c) placing the multi-dimensional samples corresponding to signals received during a first period into a first snapshot, (d) extracting multi-dimensional samples from the first snapshot corresponding to one or more first pulse trains identified using a first algorithm, (e) placing the multi-dimensional samples remaining in the first snapshot into a second snapshot corresponding to signals received during a second time frame longer than the first time frame, and (f) extracting multi-dimensional samples from the second snapshot corresponding to one or more second pulse trains identified using a second algorithm different from the first algorithm.

In an exemplary embodiment of the system, the system further includes a storage device for storing the first and second snapshots representing the signals received and the processor is further configured for de-interleaving multi-dimensional samples from the first snapshot using a quantized pulse repetition (PRI) technique.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION

The proliferation of radar threats agile in pulse repetition frequency (PRF) and/or pulse repetition interval (PRI) has placed an ever-increasing burden on radar warning receiver (RWR) and electronic counter measures (ECM) systems to correctly intercept, identify and countermeasure these threats. As will be explained, the present invention identifies radar threats and de-interleaves pulse trains associated with such radar threats in various dense electronic warfare (EW) environments.

Figure 1:
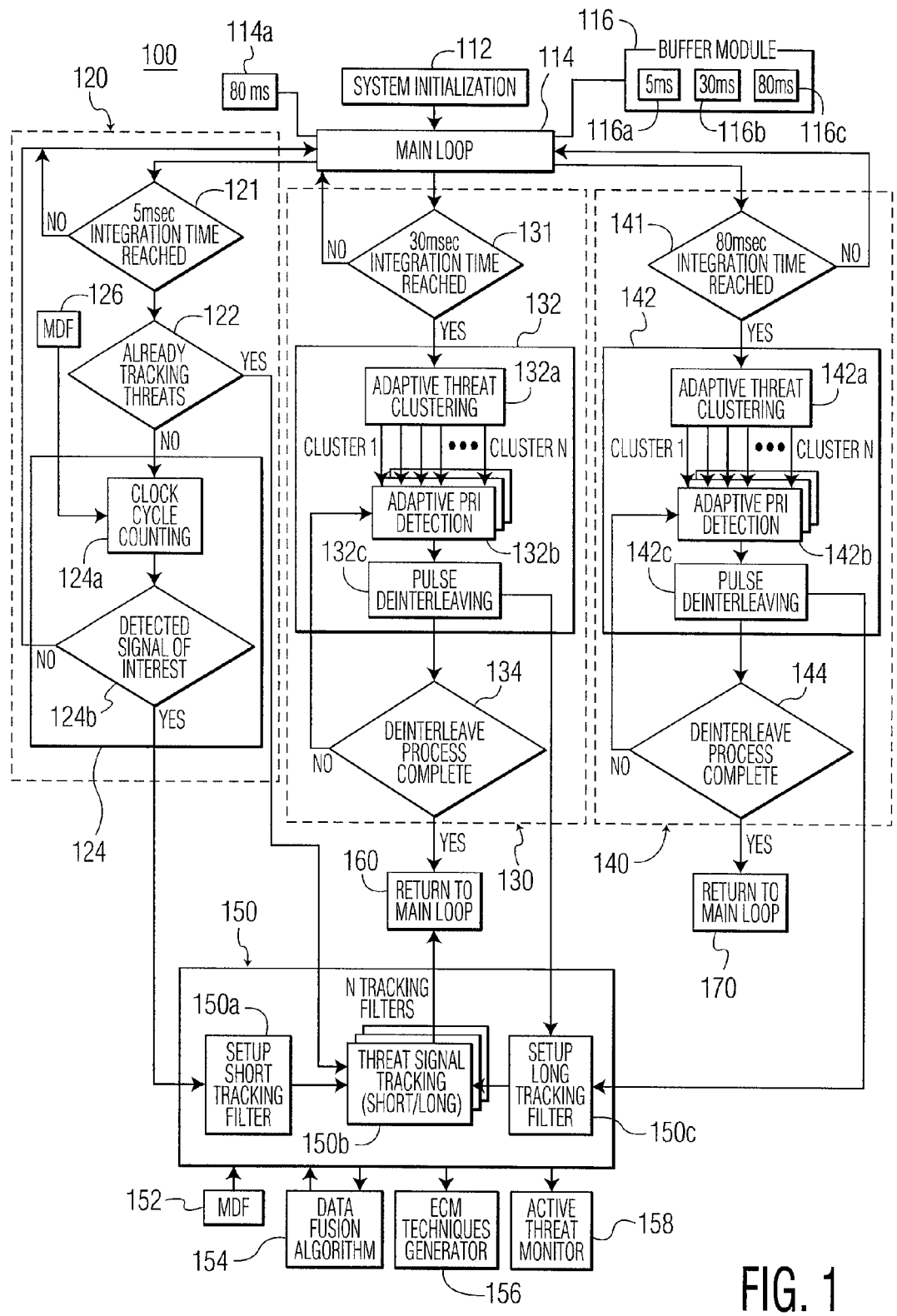
FIG. 1 is a functional block diagram detailing the processing performed by a system for detecting radar emitters and pulse train de-interleaving, in accordance with an embodiment of the present invention.

Referring to FIG. 1, there is shown a functional block diagram of a system for detecting radar emitters and de-interleaving pulse trains of radar signals produced by such detected radar emitters, in accordance with an embodiment of the present invention. The system, generally designated by 100, includes three processing modules: a processing module 120 for detecting and de-interleaving pulses received over a 5 millisecond (ms) time frame, a processing module 130 for detecting and de-interleaving pulses received over a 30 ms time frame, and a processing module 140 for detecting and de-interleaving pulses received over an 80 ms time frame.

Processing in system 100 begins with a processing block 112 which performs system initialization. In system initialization, radar pulse train PRI detection and de-interleaving algorithms (performed by processing modules 120, 130, 140), tracking filters 150, and all registers containing data (PDWs, etc.), such as buffers 116, are cleared. After system 100 is initialized, processing continues to a main loop 114 which directs and routes the processing performed by system 100. Main loop 114 also collects radar pulses that are received during a predetermined interval of time (i.e., a time frame). Such interval of time may be fixed based on the threat environment and/or the processing throughput of system 100. Exemplary intervals of time may vary between 4 ms duration to 200 ms duration, for example. In the exemplary embodiment of system 100 illustrated in FIG. 1 and described below, main loop 114 collects radar pulses received over an 80 ms interval of time as an 80 ms input snapshot 114a and processes such 80 ms snapshot 114a using processing modules 120, 130, and 140.

A snapshot is defined as a collection of pulse descriptor words (PDWs) describing the characteristics of radar pulses intercepted/processed by an RWR/ESM system, such as system 100. Attributes (or parameters) used in a PDW, generally, include a pulse's (a) time of arrival (TOA), (b) radio frequency (RF), (c) pulse width (PW), (d) pulse amplitude (PA), and (e) angle of arrival (AOA), when available. In the process of collecting the radar pulses received over the 80 ms interval of time and developing the 80 ms input snapshot 114a, main loop receives a PDW for each received radar pulse and identifies such PDWs, collectively, as 80 ms input snapshot 114a.

As will be described below, system 100 processes 80 ms input snapshot 114a in smaller, consecutive 5 ms snapshots, as they are completed, to detect and remove PDWs corresponding to radar sources in each of the 5 ms snapshots using a first algorithm. PDWs not detected and removed are placed into larger snapshots for further processing using second algorithms. In the exemplary embodiment discussed below, the larger snapshots comprise consecutive 30 ms snapshots. System 100 processes the larger snapshots to detect and remove PDWs from the larger snapshots. PDWs not detected and removed are placed into still larger snapshots for still further processing using third algorithms. In the exemplary embodiment discussed below, the still larger snapshots comprise an 80 ms snapshot, which may be considered the same bin as 80 ms input snapshot 114c (with PDWs identified and removed by the first and second algorithms) or different. This operation of placing PDWs remaining in certain snapshots following certain processing and placing them into further snapshots for further processing is referred to herein as "time progressive processing."

More specifically, as will be described below, system 100 processes PDWs of 80 ms input snapshot 114a using a 5 ms buffer 116a, a 30 ms buffer 116b, and an 80 ms buffer 116c after system 100 has finished placing PDWs into each respective buffer. Buffer 116A stores a 5 ms snapshot of PDWs; buffer 116b stores a 30 ms snapshot of PDWs; and buffer 116c stores an 80 ms snapshot of PDWs that may be viewed as the same bin as 80 ms input snapshot 114a or different. Decision modules 121, 131, and 141 determine when system 100 has finished adding PDWs to respective buffers 116a, 116b, and 116c over respective 5 ms, 30 ms, and 80 ms time frames and when processing is to be performed on the snapshots in respective buffers 116a, 116b, and 116c.

Although the description herein makes reference to 5, 30, and 80 ms snapshots, other embodiments of system 100 are contemplated as having snapshots of lengths other than 5, 30, and 80 ms. Generally, in such embodiments, system 100 processes input snapshot 114a using snapshots having a first length, a second length, and a third length, the second length being longer than the first and the third being longer than the second. Furthermore, in such embodiments, buffers 116a, 116b, and 116c are not limited to being, respectively, 5, 30, and 80 ms buffers but, instead, are sized to store the snapshots having the first, second, and third lengths.

Processing of 80 ms input snapshot 114a is now described. Main loop 114 directs processing of 80 ms input snapshot 114a of PDWs, first, by dividing the 80 ms snapshot into a series of consecutive 5 ms snapshots, successively placing each 5 ms snapshot into 5 ms buffer 116a, and processing such snapshots in buffer 116a. In one exemplary embodiment, system 100 receives radar threat pulses over an 80 ms time interval, develops an 80 ms snapshot 114a of such pulses, and processes 80 ms snapshot 114a in smaller 5 ms snapshots after 80 ms snapshot 114a is completed. In another exemplary embodiment, main loop 114 develops PDWs of pulses as they are received, maintains the developed PDWs as part of 80 ms input snapshot 114a, and processes PDWs of 80 ms snapshot 114a corresponding to a smaller 5 ms snapshot, once such smaller 5 ms snapshot is completed. Thus, in this latter embodiment, system 100 does not wait to complete an entire 80 ms snapshot before processing received pulses.

Decision module 121 includes a loop counter that increments over a 5 ms time interval. When processing passes from main loop 114 to decision module 121, decision module 121 increments the counter. If decision module 121 determines that a 5 ms time interval has elapsed based on the counter, processing in system 100 passes to module 122. Otherwise, processing loops back to main loop 114 for later passing, again, to decision module 121 to increment the counter again. Processing also passes to decisions modules 131 and 141 successively or in parallel with the passing of processing to decision module 121, as described below, to effect successive or parallel processing among modules 120, 130, and 140.

Although FIG. 1 illustrates three processing modules 120, 130, and 140, other embodiments with fewer or more processing modules are contemplated. In such other embodiments, system 100 processes input snapshot 114a using fewer or greater numbers of buffers than the three (buffers 116a, 116b, and 116c) illustrated in FIG. 1, where each buffer is processed using a unique processing module.

Continuing, in module 122, to reduce processing throughput, each PDW in 5 ms buffer 116a is examined to determine whether it belongs to a pulse train that is already being de-interleaved and tracked by system 100 using short and long tracking filters maintained by a threat signal tracking module 150b. PDWs which meet the tracking conditions (e.g. tracking gates in TOA and/or RF) of a particular tracking filter are removed from buffer 116a and sent to threat signal tracking module 150b to update the particular tracking filter. PDWs which do not meet tracking conditions are subject to quantized PRI detection in detection module 124.

Detection module 124 performs clock cycle counting in block 124a using a mission data file (MDF) 126. Processing continues to decision block 124b which performs quantized PRI detection on the PDWs in 5 ms buffer 116a using a quantized PRI detection algorithm. If the quantized PRI detection algorithm detects or identifies new pulse trains of interest, the PDWs corresponding to the newly identified pulse trains are passed from decision block 124*b* to module 150*a* to establish short tracking filters corresponding to the newly detected pulse trains. In threat signal tracking module 150*b*, a new short tracking filter is created for each newly identified pulse train. Processing continues to threat signal tracking module 150*b* where the PDWs corresponding to the newly detected pulse trains are removed from 5 ms buffer 116*a*. Processing then returns to main loop 114 via return to main loop 160.

If the quantized PRI detection algorithm implemented in decision module 124*b* detects no new pulse trains in 5 ms buffer 116*a*, processing in system 100 passes from decision module 124*b* back to main loop 114. Main loop 114 then determines whether any PDWs remain in buffer 116*a*. If PDWs do remain, they are removed from buffer 116*a* and placed into the 30 ms snapshot stored in 30 ms buffer 116*b*. If no PDWs remain in buffer 116*a*, main loop 114 simply continues directing the processing of system 100.

System 100 iterates through processing module 120 to processes the pulses in each of the consecutive 5 ms snapshots of 80 ms input snapshot 114*a*. Each consecutive 5 ms snapshot is stored in 5 ms buffer 116*a*, and processing in module 120 of the new PDWs in 5 ms buffer 116*a* continues in the manner describe above with relation to decision module 122, module 124*a*, and decision module 124*b*.

As described above, system 100 also includes a decision module 131. Decision module 131 includes a loop counter that increments over a 30 ms time interval in a similar way to how decision module 121 increments its counter. In one embodiment, processing passes from main loop 114 to decision module 131 in parallel with the passing of processing from main loop 114 to decision module 121. Thus, processing is accomplished in modules 120 and 130 at the same time, i.e., in parallel, when processing is required in such modules. In another embodiment, each time after processing from main loop 114 passes to decision module 121 and returns to main loop 114, processing passes from main loop 114 to decision module 131. Thus, processing in modules 120 and 130 is accomplished one after the other, i.e., successively.

When processing passes from main loop 114 to decision module 131, decision module 131 increments its counter. If decision module 131 determines that a 30 ms time interval has elapsed based on the counter, processing in system 100 passes to module 132 and, specifically, to adaptive threat clustering module 132*a*. Otherwise, processing loops back to main loop 114 for later passing, again, to decision module 131 to increment the counter again.

Adaptive threat clustering module 132*a* provides threat clustering of PDWs in the 30 ms snapshot stored in 30 ms buffer 116*b* using an ITT-developed adaptive algorithm. The adaptive algorithm is based on a technique known as ISO-DATA (Iterative Self Organizing Data Analysis) which is an unsupervised iterative classification algorithm used for pattern recognition. The adaptive threat clustering algorithm operates iteratively. At each iteration, PDWs in buffer 116*b* are clustered and the clustering result is examined to determine whether (a) additional clusters are needed by splitting current clusters, and/or (b) multiple clusters may be eliminated by merging current clusters.

The splitting and merging of clusters are conducted based on similarity tests, such as using Euclidean distance between all radar PDWs. Threat clustering ends when either (a) no clustering activity is required (or detected), or (b) a pre-set number of iterations is completed. The threat clustering algorithm usually converges and assigns all PDWs in 30 ms buffer 116*b*. To increase processing efficiency, threat clustering operates adaptively according to the attributes selected for clustering and the cluster size selected for acquiring frequency/PRI agile threats. The operation of adaptive threat clustering module 132*a* is described in greater below with respect to FIG. 5.

Continuing, after multiple clusters (1 to N) are established by adaptive threat clustering module 132*a*, the PDWs in each established cluster are provided as input signals to adaptive PRI detection module 132*b*. It is possible that a cluster may include PDWs for pulses which belong to different radar emitters, but have been grouped into the same cluster. Accordingly, further processing of each PDW in a cluster is provided by the present invention in adaptive PRI detection module 132*b* and de-interleaving module 132*c*.

As will be explained later, depending on the operational condition and the EW environment, one of two PRI sorting techniques are selected for implementation by adaptive PRI detection module 132*b*. Generally, a differential time-of-arrival (DTOA) histogram technique is used to process PDWs in a 30 ms snapshot. Another technique, referred to herein as a "pattern search algorithm," may also be used in module 132*b*. The pattern search algorithm is used for detecting "unquantized pattern" PRIs with a sawtooth, triangular, sinusoidal, jitter, or pseudo-random pattern. It is used when PDWs of pulse trains with fixed, dwell-switched and stagger PRIs have all been detected, de-interleaved and removed from buffer 116*a*.

Referring next to de-interleaving module 132*c*, the PDWs of radar pulse trains of detected PRIs from adaptive PRI detection module 132*b* are received in module 132*c* and de-interleaved from the 30 ms snapshot in buffer 116*b*. De-interleaved PDWs are then sent to threat signal tracking module 150*c* to establish new or refresh existing tracking filters maintained by module 150*b*. Information from the tracking filters is correlated with a mission data file (MDF) 152 (which may be the same as MDF 126) and a data fusion algorithm 154 to perform a threat identification function. Results of the threat identification and the threat pulse timing information (as obtained from the tracking filters) will be sent to an ECM techniques generator 156 and to update the active threat monitor 158. This information is then used to synthesize/generate selected ECM countermeasures.

As shown, module 150*b* includes N tracking filters, where each filter maintains a track of one de-interleaved pulse train. It will be appreciated that the number (N) of tracking filters may be the same or different from the number (N) of clusters. As described above, the tracking filters maintained by module 150*b* are used by decision module 122 to remove PDWs from 5 ms buffer 116*a*. Tracking gates (in TOA and/or RF) for the pulse trains currently being tracked are generated to test pulses from buffer 116*a* in module 122. As described above, PDWs which fall within the tracking gates are removed from 5 ms buffer 116*a* and sent to threat signal tracking module 150*b* to update the tracking filters. Such PDWs are not stored within the 30 ms snapshot maintained by 30 ms buffer 116*b*.

Decision box 134 determines whether the de-interleaving process for the PDWs in the 30 ms snapshot in 30 ms buffer 116*b* is complete. If decision box 134 determines that the de-interleaving process is not complete, then system 100 branches back to adaptive PRI detection module 132*b* and continues the PRI detection process. Additional adaptive PRI detection is performed on any PDWs remaining in buffer 116*b* and clustered by adaptive threat clustering module 132*a*. This sequential and re-occurring operation of adaptive PRI detection module 132*b* and de-interleaving module 132*c* continues until either (a) all pulses in 30 ms buffer 116*b* are de-interleaved or (b) no PRI can be derived from the residual pulses remaining in 30 ms buffer 116*b*.

If the de-interleaving process is complete, system 100 branches back to main loop 114 via return to main loop 160. Main loop 114 then determines whether any PDWs remain in buffer 116*a*. If PDWs do remain, then they are removed from buffer 116*b* and placed into the 80 ms snapshot stored in 80 ms buffer 116*c*. If no PDWs remain in buffer 116*b*, buffer 116*a* need not be cleared. In either case, processing continues to decision modules 121, 131, and 141.

As described above, system 100 also includes a decision module 141. Decision module 141 includes a loop counter that increments over an 80 ms time interval in a similar way to how decision modules 121 and 131 increment their counters. In one embodiment, processing passes from main loop 114 to decision module 141 in parallel with the passing of processing from main loop 114 to decision modules 121 and 131. Thus, processing is accomplished in modules 120, 130, and 140 at the same time, i.e., in parallel, when processing is required in such modules. In another embodiment, each time after processing from main loop 114 passes to decision module 131 to increment the counter therein and returns to main loop 114, processing passes from main loop 114 to decision module 141. Thus, processing in modules 120, 130, and 140 is accomplished one after the other, i.e., successively.

When processing passes from main loop 114 to decision module 141, decision module 141 increments its counter. If decision module 141 determines that an 80 ms time interval has elapsed based on the counter, processing in system 100 passes to module 142 and, specifically, to adaptive threat clustering module 142*a*. Otherwise, processing loops back to main loop 114 for later passing, again, to decision module 141 to increment the counter again.

Module 142 processes PDWs in the 80 snapshot in 80 ms buffer 116*c* similar to how module 132 processes PDWs in the 30 ms snapshot in 30 ms buffer 116*b*. As will be described below, processing in module 142 makes use of an algorithm also used by module 132 but also makes use of an algorithm not used by module 132.

Figure 5:
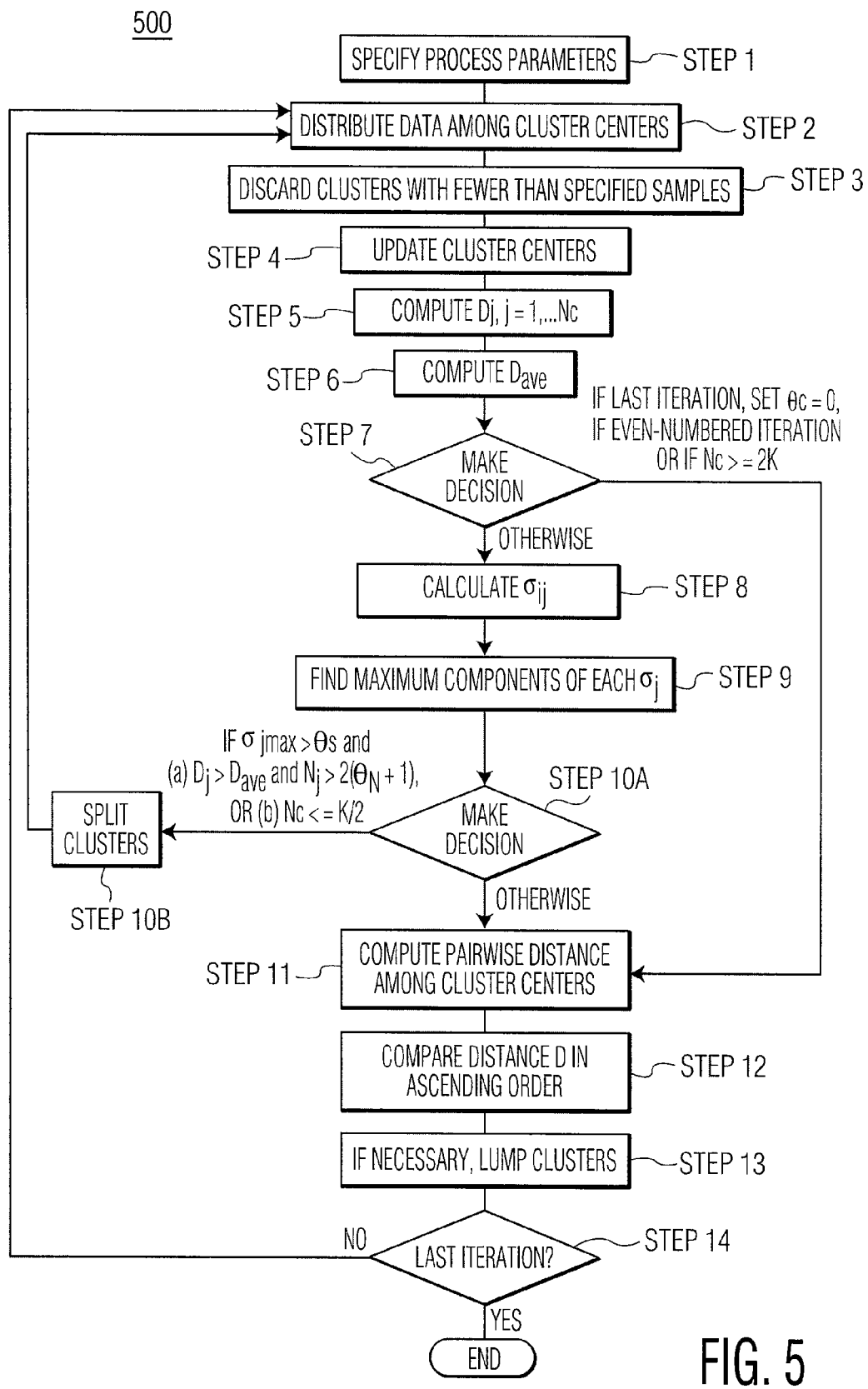
FIG. 5 is a flow diagram of an algorithm referred to herein as the ISODATA algorithm for arranging pulse descriptor words (PDWs) of multiple radar signals into different clusters, in accordance with an embodiment of the present invention.

Adaptive threat clustering module 142*a* provides threat clustering of PDWs in the 80 ms snapshot stored in 80 ms buffer 116*c* using the ISODATA clustering technique mentioned above and described in further detail below with regard to FIG. 5. After multiple clusters (1 to N) of PDWs of 80 ms buffer 116*c* are established by adaptive threat clustering module 142*a*, the PDWs in each of the established clusters are provided as input signals to adaptive PRI detection module 142*b*. It is possible that a cluster may include PDWs for pulses which belong to different radar emitters but have been grouped into the same cluster. Accordingly, further processing of each PDW in a cluster is provided by the present invention in adaptive PRI detection module 142*b* and de-interleaving module 142*c*.

As will be explained later, depending on the operational condition and the EW environment, one of two PRI sorting techniques are selected for implementation by adaptive PRI detection module 142*b*. Generally, a spectrum estimation technique is used to process pulses in an 80 ms snapshot. Another technique, a pattern search algorithm, may also be used in module 142*b*.

Referring next to de-interleaving module 142*c*, the PDWs of radar pulse trains of detected PRIs from adaptive PRI detection module 142*b* are received in module 142*c* and de-interleaved from the 80 ms snapshot in buffer 116*c*, i.e., the PDWs are removed from buffer 116*c*. De-interleaved PDWs are then sent to threat signal tracking module 150*c* to establish new or refresh existing tracking filters maintained by module 150*b*. The process of creating and refreshing tracking filters in tracking module 150*b* for threats detected and de-interleaved in module 142 is the same as that for threats detected and de-interleaved in module 132.

Decision box 144 determines whether the de-interleaving process for the PDWs in the 80 ms snapshot in 80 ms buffer 116*c* is complete. If decision box 144 determines that the de-interleaving process is not complete, then system 100 branches back to adaptive PRI detection module 142*b* and continues the PRI detection process. Additional adaptive PRI detection is performed on any PDWs remaining in buffer 116*c* and clustered by adaptive threat clustering module 142*a*. This sequential and re-occurring operation of adaptive PRI detection module 142*b* and de-interleaving module 142*c* continues until either (a) all pulses in 80 ms buffer 116*c* are de-interleaved or (b) no PRI can be derived from the residual pulses remaining in 80 ms buffer 116*c*.

If the de-interleaving process is complete, system 100 branches back to main loop 114 via return to main loop 170. System 100 clears the 80 ms snapshot of buffer 116*c* of any remaining PDWs. Processing of the 80 ms input snapshot 114*a* is complete. System 100 may then receive new radar signals and process those signals in a new 80 ms input snapshot 114*a*.

Although the discussion regarding FIG. 1 refers to detecting and de-interleaving PDWs in snapshots held in buffers 116*a*, 116*b*, and 116*c* corresponding to pulses trains produced by radar transmitters, it is understood that such discussion may generally refer to detecting and de-interleaving pulses from buffers. Using such a terminology, system 100 receives pulses, stores pulses received over 5 ms in buffer 116*a*, detects pulses in buffer 116*a* corresponding to a radar threat, de-interleaves or removes such pulses from buffer 116*a*, establishes tracking filters to track such pulses, and places pulses remaining in buffer 116*a* into buffer 116*b* for further processing. Analogous processing is performed for buffers 116*b* and 116*c*.

As discussed above, in one embodiment, processing passes from main loop 114 to decision modules 121, 131, and 141 in parallel to increment the counters maintained by decision modules 121, 131, and 141. In such an embodiment, processing in modules 120, 130, and 140 progresses in parallel, although parallel processing in such modules does not necessarily always occur at all times. For example, every 30 ms, processing in module 130 will overlap, and hence occur in parallel, with processing in module 120. Once processing in module 130 completes, processing will only occur again in another 30 ms. If processing in module 130 completes before 30 ms have elapsed, until the 30 ms elapses, processing does not occur again in parallel between modules 120 and 130.

In the other embodiment discussed above, decision modules 121, 131, and 141 increment their clocks one after the other, i.e., successively. In such an embodiment, processing in modules 120, 130, and 140 also progresses successively when processing in such module is to occur at the same time. For example, every 30 ms, after processing in module 120 has completed several iterations (corresponding to processing six 5 ms snapshots), processing in module 130 is performed while processing in module 120 is put on hold. After 80 ms, after processing in module 120 is complete, processing in module 140 is performed while processing in modules 120 and 130 is put on hold.

Figure 2:
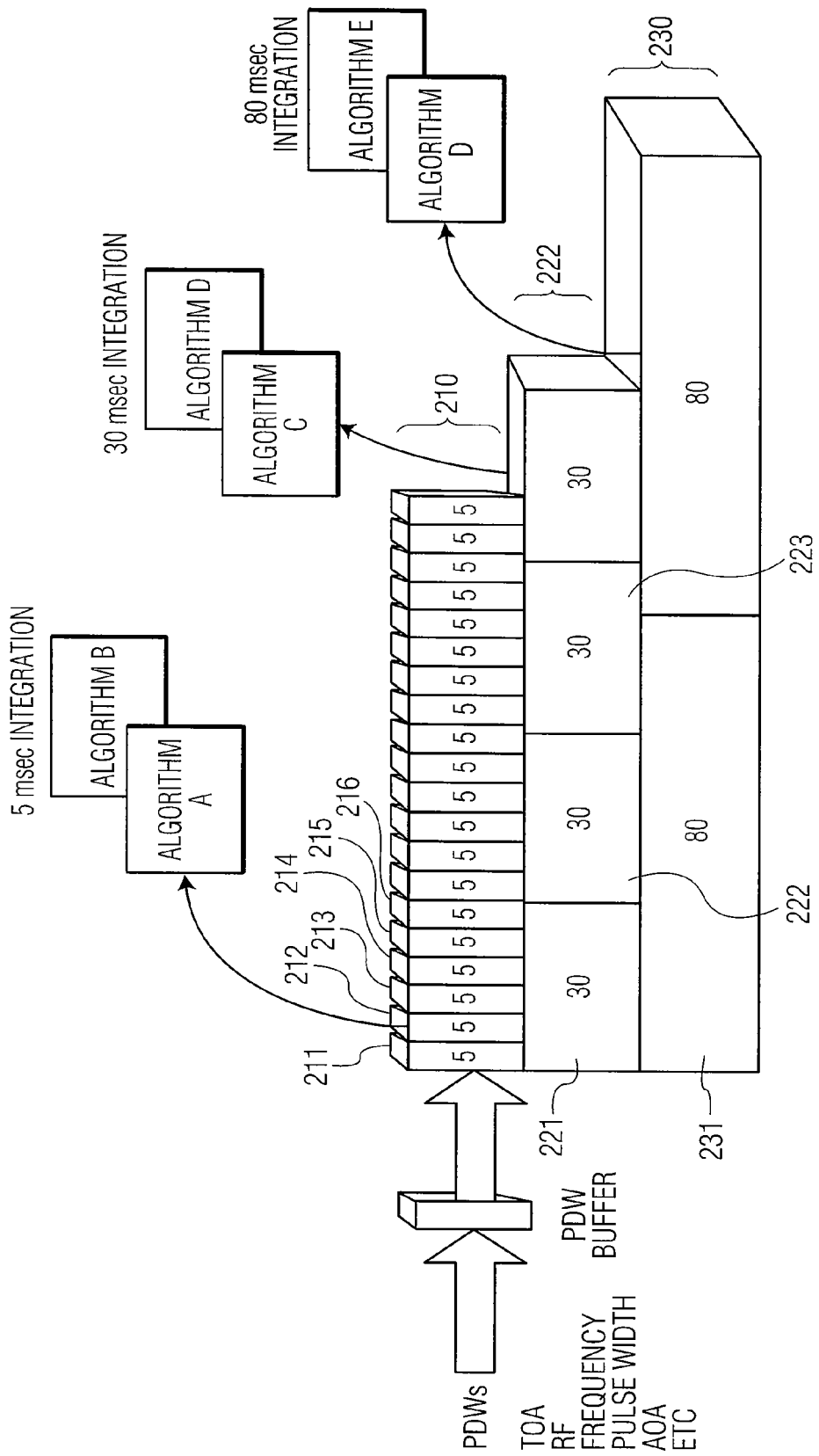
FIG. 2 is an illustration of time progressive processing of radar pulses associated with first, second, and third pluralities of consecutive time frames, in accordance with an embodiment of the present invention.

Referring now to FIG. 2, there is illustrated a relationship among consecutive first time frames 210 which correspond to consecutive 5 ms snapshots, consecutive second time frames 220 which correspond to consecutive 30 ms snapshots, and consecutive third time frames 230 which correspond to consecutive 80 ms snapshots. By illustrating the relationship between such first, second, and third consecutive time frames, FIG. 2 also illustrates, graphically, how time progressive processing is performed by the system illustrated in FIG. 1.

As can be seen, six consecutive 5 ms time frames (e.g., time frames 211, 212, 213, 214, 215, and 216) correspond to one 30 ms time frame (e.g., time frame 221), and two 30 ms time frames (e.g., time frames 221 and 222) plus a fraction (⅔) of a third 30 ms time frame (e.g., time frame 223) correspond to one 80 ms time frame (e.g., time frame 231). Each of the 5 ms time frames 210 corresponds to a plurality of radar pulses received during each of the 5 ms time frames; each of the 30 ms time frames 220 corresponds to pulses remaining in a respective block of six consecutive 5 ms time frames after pulses have been de-interleaved from the six consecutive 5 ms time frames; and each of the 80 ms time frames 230 corresponds to pulses remaining in respective consecutive 30 ms time frames plus a fraction (⅔) of a third consecutive time frame after pulses have been de-interleaved from such 30 ms time frames.

Figure 3:
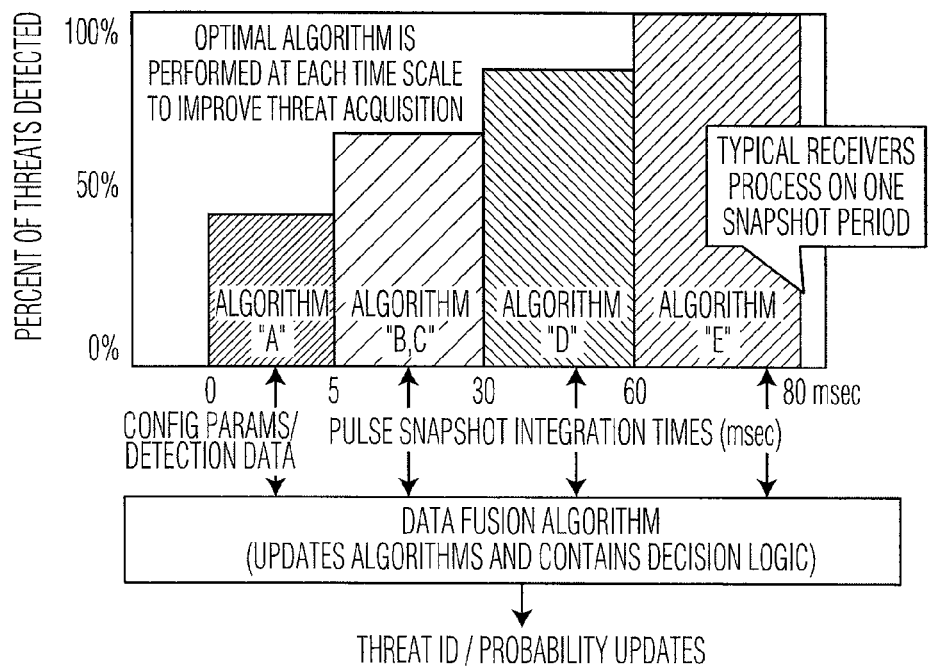
FIG. 3 is a graph illustrating a percent of radar sources or threats detected by the processing illustrated in FIG. 1 over time, in accordance with an embodiment of the present invention.

Illustrated in FIG. 3 are algorithms A through E that are used to process pulses, or more specifically PDWs corresponding to such pulses, in each of the 5, 30, and 80 ms snapshots discussed above. First algorithms A and B may be used to process pulses or PDWs in each of the 5 ms time frames 210 illustrated in FIG. 2. In an exemplary embodiment, Algorithm A corresponds to the quantized PRI detection algorithm implemented in module 124b of FIG. 1 by which pulses in a 5 ms snapshot are detected and removed, and algorithm B corresponds to the algorithm illustrated in FIG. 1 implemented in modules 122 and 150b by which pulses corresponding to already tracked threats are detected and removed from a 5 ms snapshot.

Algorithm C is used to process pulses or PDWs in each of the 30 ms snapshots 220 illustrated in FIG. 2. In an exemplary embodiment, algorithm C corresponds to the DTOA histogram technique implemented in module 132b of FIG. 1 by which pulses in a 30 ms snapshot are detected and removed. Algorithm D is used to process pulses or PDWs in each of the 30 ms snapshots 220 or 80 ms snapshots 230 illustrated in FIG. 2. In an exemplary embodiment, algorithm D is the pattern search algorithm implemented in module 132b and module 142b of FIG. 1 by which pulses in 30 and 80 ms snapshots are detected and removed.

Finally, algorithm E is used to process pulses or PDWs in each of the 80 ms snapshots 230 illustrated in FIG. 2. In an exemplary embodiment, algorithm E is the spectrum estimation technique implemented in module 142b of FIG. 1 by which pulses in an 80 ms snapshot are detected and removed.

Pulses in 5 ms time frames 211-216 not detected and removed by processing modules 122, 124b and 150b, i.e., by algorithms A and B, are placed into a first 30 ms time frame 221 for further processing using algorithms C or D. Pulses not removed by module 132c from 30 ms time frames 221 and 222 and the first ⅔ of 30 ms time frame 223 are placed into 80 ms time frame 231 for further processing using algorithms D or E.

Referring now to FIG. 3, there is illustrated a graph displaying the percent of threats detected over time using each of algorithms A through E. FIG. 3 identifies a bar spanning from 0 to 5 ms with the label "Algorithm 'A'" to signify the percent of threats identified by algorithm A between 0 and 5 ms. As illustrated, algorithm A detects slightly fewer than 50% of the total existing threats during a first 5 ms time frame.

Continuing, FIG. 3 identifies a bar spanning from 5 to 30 ms with the label "Algorithm 'B,C'" to signify the percent of threats identified by algorithms B and C between 5 and 30 ms.

As illustrated, algorithm B, which is used to process threats in 5 ms time frames, and algorithm C, which is used to process threats within a 30 ms time frame, result in slightly fewer than 70% of the total existing threats being detected by the time the 30 ms mark has been reached.

In an exemplary embodiment, algorithm B corresponds to a tracking filter that detects known threats, i.e., threats originally identified by algorithm A. Thus, in such an exemplary embodiment, algorithm B detects a percent of threats equal to those detected by algorithm A, i.e., slightly fewer than 50% of the total threats existing within the five 5 ms time frames spanning from 5 ms to 30 ms. Although the bar illustrated in FIG. 3 as corresponding to algorithm C spans from 5 ms to 30 ms, it is understood that algorithm C operates on a first 30 ms time frame, i.e., from 0 ms to 30 ms. Algorithm C detects approximately 20% (the difference between the bars labeled as "Algorithm 'B,C'" and "Algorithm 'A'") of the total threats during the first 30 ms time frame.

Continuing, FIG. 3 identifies a bar spanning from 30 to 60 ms with the label "Algorithm 'D'" to signify the percentage of threats identified by algorithm D between 30 and 60 ms. Although not illustrated, the bar spanning from 30 to 60 ms includes the percentage of treats detected by algorithms A-C. Thus, algorithm D detects approximately a further 15% (the difference between the bars labeled as "Algorithm 'D'" and "Algorithm 'B,C'") of the total threats during the second 30 ms time frame. The other portion of the percentage of threats indicated as detected by the bar spanning from 30 to 60 ms is detected by algorithms A-C.

Finally, FIG. 3 identifies a bar spanning from 60 to 80 ms with the label "Algorithm 'E'" to signify the percentage of threats identified by algorithm E. Although not illustrated, the bar spanning from 60 to 80 ms includes the percentage of threats detected by algorithms A-D. Thus, algorithm E detects approximately a further 15% (the remaining unidentified threats). Additionally, although algorithm E is associated with a bar spanning from 60 to 80 ms in FIG. 3, algorithm E is used to process unidentified threats remaining in the time frame from 0 to 80 ms not identified by algorithms A-D.

As illustrated in FIG. 3, the results of processing by each of algorithms A through E are sent to a data fusion algorithm 154 which combines information from mission data file (MDF) 152 and the tracking filters maintained by module 150b (illustrated in FIG. 1) and provides the capability for threat emitter mode identification, tracking, and accurate electronic countermeasure signal generation response performed by an ECM techniques generator 156.

By processing received radar pulses in a time progressive fashion, such as that illustrated in FIG. 3, system 100 is able to improve the accuracy and speed of electronic countermeasure response over systems that do not perform time progressive processing. Accuracy is improved as ECM techniques generator 156 refines the ECM signal being generated as system 100 gets improved measurements from different processing times (5, 30, 80 ms, for example). Thus, if a threat emitter is intercepted and is identified in a first 5 ms interval, system 100 allows for the sending out of a generic jamming technique. As additional tracking information over subsequent 5 ms intervals is identified, system 100 allows for the refinement of the jamming technique as such additional tracking information may provide an identity of the specific threat and the mode in which it is operating. Thus, system 100 may exploit a specific vulnerability for ECM generation of the known threat and mode.

The adaptive threat clustering modules, designated as 132b and 142b in FIG. 1, will now be described in greater detail by referring to U.S. application Ser. No. 11/345,949, filed on Feb. 2, 2006, by inventors Paul C. Wang et al. U.S. application Ser. No. 11/345,949 and the present application are commonly owned by ITT Manufacturing Enterprises, Inc. of Wilmington, Del. U.S. application Ser. No. 11/345,949 is incorporated herein by reference in its entirety. Portions of U.S. application Ser. No. 11/345,949 are described below with references to FIGS. 4 and 5 of the present application.

Each of adaptive threat clustering modules 132*a* and 142*a* forms clusters from a set of input data (samples), where each cluster consists of very similar data (samples). The module first defines a measure of pattern similarity and establishes a rule for assigning individual samples to the domain of a specific cluster center. The module uses a Euclidean distance between two data points x and z, $$D = \|x - z\|$$

as a measure of pattern similarity. The smaller the distance, D, the greater is the similarity between x and z.

After a measure of pattern similarity is selected, the module sorts (or partitions) samples into cluster domains. The Euclidean distance measure, D, lends itself to this procedure, because it is a good measure of proximity. However, because the proximity of two patterns is a relative measure of similarity, it is necessary for the module to establish a threshold to define degrees of acceptable similarity for the clustering process, or method.

A performance-index is chosen to measure the degrees of similarity and a procedure is used which minimizes the chosen performance index. One such performance index is the sum of the squared errors resulting from the cluster, and is a proximity measure given by $$J = \sum_{j=1}^{Nc} \sum_{x \in S_j} \|x - m_j\|^2$$

where Nc is the number of cluster domains (or simply clusters), Sj is the set of samples belonging to the jth domain, and $$m_j = (1/Nj) \sum_{x \in S_j} x$$

is the sample mean vector of set Sj, with Nj representing the sample size of Sj.

There are other performance indices used in the method of clustering the samples, such as: (1) average squared distances between samples in a cluster domain, (2) average squared distances between samples in different cluster domains, (3) indices based on a scatter matrix and (4) minimum and maximum variance indices.

An embodiment used by each of adaptive threat clustering modules 132*a* and 142*a* is based on an algorithm referred to as Iterative Self Organizing Data Analysis Techniques (ISODATA). The ISODATA algorithm, generally designated as 500, is shown in FIG. 5, and is further described below.

For a set of N samples, $\{x_1, x_2, \ldots, x_N\}$, ISODATA clustering algorithm includes the following steps:

Step 1: Specify various clustering parameters, as follows:
K=number of cluster centers desired;
$\theta_N$=the minimum number of samples allowed in a cluster;
$\theta_S$=standard deviation parameter;
$\theta_C$=lumping parameter;
L=maximum number of pairs of cluster centers which may be lumped;
I=number of iterations allowed.

Step 2: Distribute the N samples among the present cluster centers, using the following relationship:

$$x \in Sj \text{ if } \|x - zj\| \leq \|x - zi\|, i = 1, 2, \ldots, Nc; i \neq j$$

for all x in the sample set. In this notation, Sj represents the subset of samples assigned to the cluster center zj.

Step 3: Discard sample sets with fewer than $\theta_N$ members. That is, if for any j, $Nj < \theta_N$, discard Sj and reduce Nc by 1.

Step 4: Update each cluster center zj, j=1, 2, . . . , Nc, by setting it equal to the sample mean of its members (Sj), as follows:

$$z_j = \frac{1}{N_j} \sum_{x \in S_j} x, \quad j = 1, 2, \ldots, Nc$$

where Nj is the number of samples in Sj.

Step 5: Compute the average distance Dj of samples in cluster domain Sj from their corresponding cluster center, using the following relationship:

$$D_j = \frac{1}{N_j} \sum_{x \in} \|x - zj\|, \quad j = 1, 2, \ldots Nc$$

Step 6: Compute the overall average distance of the samples from their respective cluster centers, using the following relationship:

$$D_{ave} = \frac{1}{N_c} \sum_{j=1}^{Nc} N_j D_j$$

Step 7: The following decisions are then made:
(a) If this is the last iteration, set $\theta_c = 0$ and go to Step 11;
(b) If Nc$\leq$K/2, then go to Step 8;
(c) If this is an even-numbered iteration, or if Nc$\geq$2K, go to Step 11; otherwise continue.

Step 8: Find the standard deviation vector $\sigma_j = (\sigma_{1j}, \sigma_{2j}, \ldots, \sigma_{nj})'$ for each sample subset, using the following relationship:

$$\sigma_{ij} = \sqrt{\frac{1}{N_j} \sum_{x \in Sj} (x_{ik} - z_{ij})^2}, \quad i = 1, 2, \ldots n; \quad j = 1, 2, \ldots, Nc$$

where n is the sample dimensionality, $x_{ik}$ is the ith component of the kth sample in Sj; $z_{ij}$ is the ith component of $z_j$, and Nj is the number of sample in Sj. Each component of $\sigma_j$ represents the standard deviation of the samples in Sj along a principal coordinate axis.

Step 9: Find the maximum component of each $\sigma_j$, j=1, 2, . . . , Nc and denote it by $\sigma_{jmax}$.

Step 10: If for any $\sigma_{jmax}$, j=1, 2, . . . , Nc, there are $\sigma_{jmax} > \theta_S$ and
(a) Dj>$D_{ave}$ and Nj>2($\theta_N$+1),
or
(b) Nc$\leq$K/2 then split zj into two new cluster centers $zj^+$ and $zj^-$, delete zj, and increase Nc by 1.

Cluster center $zj^+$ is formed by adding a given quantity $\gamma_j$ to the component zj which corresponds to the maximum component of $\sigma_j$, ($\sigma_{jmax}$). Similarly, $zj^-$ is formed by subtracting $\gamma_j$ from the same component of zj. One way of specifying $\gamma_j$ is to let it be equal to a fraction of $\sigma_{jmax}$, that is $\gamma_j=k\sigma_{jmax}$ with $0<k<1$.

If splitting took place in this step, then go to Step 2; otherwise continue.

Step 11: Compute the pairwise distances Dij between all cluster centers, as follows:

$$D_{ij}=\|z_i-z_j\|, i=1, 2, \ldots, Nc-1; j=i+1, \ldots, Nc$$

Step 12: Compare the distances Dij against the parameter $\theta_C$. Arrange the L smallest distances which are less than $\theta_C$ in ascending order, as follows:

$$[Di_1j_1, Di_2j_2, \ldots, Di_Lj_L]$$

where $Di_1j_1<Di_2j_2<\ldots<Di_Lj_L$ and L is the maximum number of pairs of cluster centers which may be lumped together. The lumping process is described below in Step 13.

Step 13: With each distance $Di_kj_k$, there is associated a pair of cluster centers $zi_k$ and $zj_k$. Starting with the smallest of these distances, perform a pairwise lumping operation, according to the following relationship:

For k=1, 2, . . . , L, if neither $zi_k$ nor $zj_k$ has been used in lumping during this iteration, merge these two cluster centers, using the following relationship:

$$z_k^* = \frac{1}{N_{ik}+N_{jk}}[N_{ik}(z_{ik})+N_{jk}(z_{jk})]$$

Delete $zi_k$ and $zj_k$ and reduce Nc by 1.

It is noted that only pairwise lumping is allowed and that a lumped cluster center may be obtained by weighting each old cluster by the number of samples in its domain. It will be understood that since a cluster center can only be lumped once, this step may not always result in L lumped centers.

Step 14: If this is the last iteration, the algorithm terminates. Otherwise, go to Step 1 if any of the process parameters requires changing at the user's discretion, or go to Step 2 if the parameters are to remain the same for the next iteration. An iteration is counted every time the procedure returns to Step 1 or 2.

Figure 4:
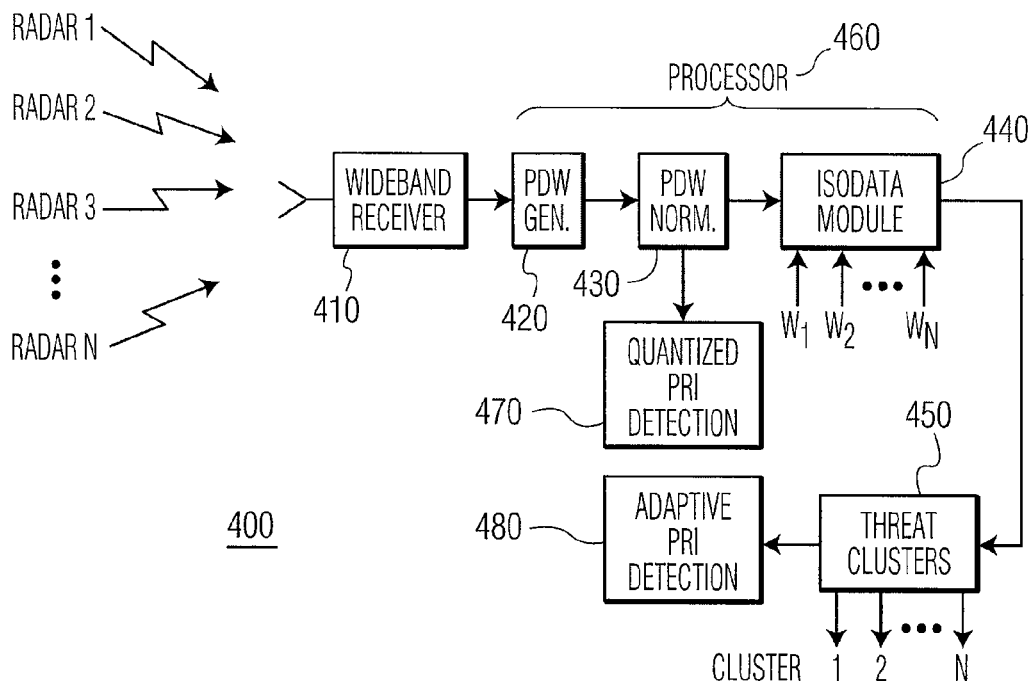
FIG. 4 is a block diagram of a wideband receiver for receiving and processing signals from multiple radar sources or threats, in accordance with an embodiment of the present invention.

Referring to FIG. 4, there is illustrated a system 400 which receives multiple radar signals (designated as "RADAR 1," "RADAR 2," "RADAR 3," . . . , "RADAR N") comprising pulse trains and processes such signals using the processing system illustrated in FIG. 1. System 400 includes a wideband receiver 410 for receiving desired components of each RADAR 1 through RADAR N. System 100 also includes a processor 460, coupled to wideband receiver 410, for generating a PDW for each pulse of RADAR 1 through RADAR N using a PDW generator 420, for normalizing each PDW using a PDW normalizer 430, and for detecting PRIs using a quantized PRI detection module 470 and an adaptive PRI detection module 480.

From PDW normalizer 430, normalized PDWs are sent to an ISODATA module 440 or a quantized PRI detection module 470 for further processing. Quantized PRI detection module 470 identified threats in the normalized PDWs using a quantized PRI detection algorithm. ISODATA module 440 clusters each normalized PDW into a respective cluster and executes the steps of the ISODATA algorithm discussed above. After a predetermined number of iterations of the ISODATA algorithm, the clusters of PDWs may be formed and stored in threat clustering module 450, which may be included in processor 460 or may be a separate module. All the clusters, 1-N (which may or may not be the same as RADARS 1-N) are provided to adaptive PRI detection module 480 for further processing.

Each raw PDW is normalized by module 430 of system 400, using the following relationship:

$$PDW_{Nor}=[PDW_{Raw}-PDW_{Ave}]/STD_{PDW}$$

where $PDW_{Nor}$ is the individual normalized PDW vector, $PDW_{raw}$ is the individual PDW as intercepted by wideband receiver 410, $PDW_{Ave}$ is the average PDW vector of the entire snapshot, and $STD_{PDW}$ is the standard deviation vector calculated from $PDW_{raw}$ and $PDW_{Ave}$.

In an exemplary embodiment of the invention, a performance index for measuring similarity between two PDWs uses two components, namely RF and PW.

The Euclidean distance, Dij, between PDWs (PDWi and PDWj) is calculated as follows:

$$D_{ij}=w_1(RF_i-RF_j)^2+w_2(PW_i-PW_j)^2$$

where $(RF_i, PW_i)$ and $(RF_j, PW_j)$ represent $PDW_i$ and $PDW_j$, respectively. Two weights, $w_1$ and $w_2$ (illustrated in FIG. 4) are used, as an example, to adjust the relative size of the cluster (or equivalently, the pairwise distance between cluster centers) to be generated in ISODATA. The relative size may be adjusted as a function of the overall frequency and pulse width deviations, which likely are related to the number of input radar threats of the input snapshot, or may be adjusted as a function of dedicated frequency bands in which advanced emitters may reside and need to be clustered into a specific cluster size.

It will also be appreciated that initially at the start of the ISODATA algorithm, the number of clusters may be assumed to be 1. Samples too far away from a center of this original cluster may then be dropped from the cluster and a new cluster may be formed from the dropped samples.

It will also be appreciated that in the embodiment of system 100 that performs tracking on pulses in 5 ms buffer 116a, 30 ms buffer 116b, and 80 ms buffer 116c in parallel, system 400 includes parallel ISODATA modules 440, threat cluster modules 450, quantized PRI detection modules 470, and adaptive PRI detection modules 480 for achieving the parallel processing.

It will be appreciated that system 400 may be used to cluster EW scenarios including mixes of stable radars and advanced radars, such as dwell switched and frequency agile radars.

It will also be appreciated that to cluster advanced emitters having frequency agility capability, the weights ($w_1, w_2, \ldots, w_N$, if necessary) used in Euclidean distance calculations between PDWs may be made adaptive, so that PDWs from different threats may be sorted into different clusters and PDWs from the same threat will not be partitioned into multiple clusters. As an example, the weights may be made a function of the operational frequency band of the radar emitter and the size of clusters generated may be adjusted to prevent threat splitting.

Figure 9A:
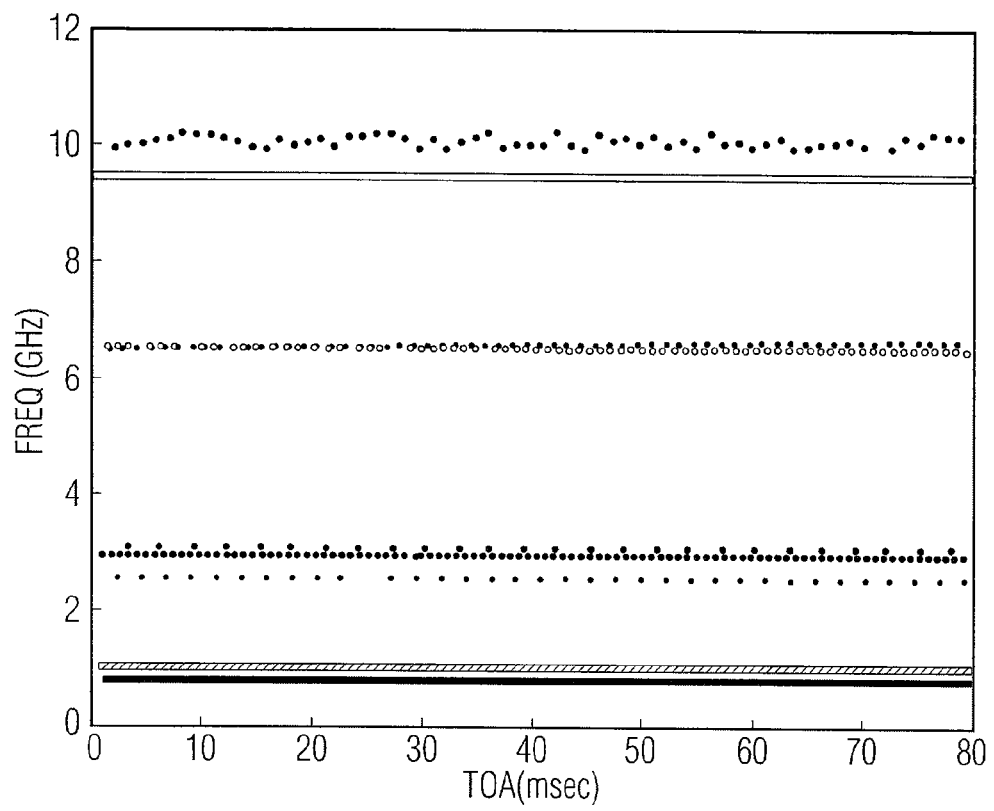
FIGS. 9A and 9B are exemplary plots showing PDWs of signals from multiple radar sources or threats as they may be intercepted by a wideband receiver during a time frame of 80 ms duration, in accordance with an embodiment of the present invention.
Figure 9B:
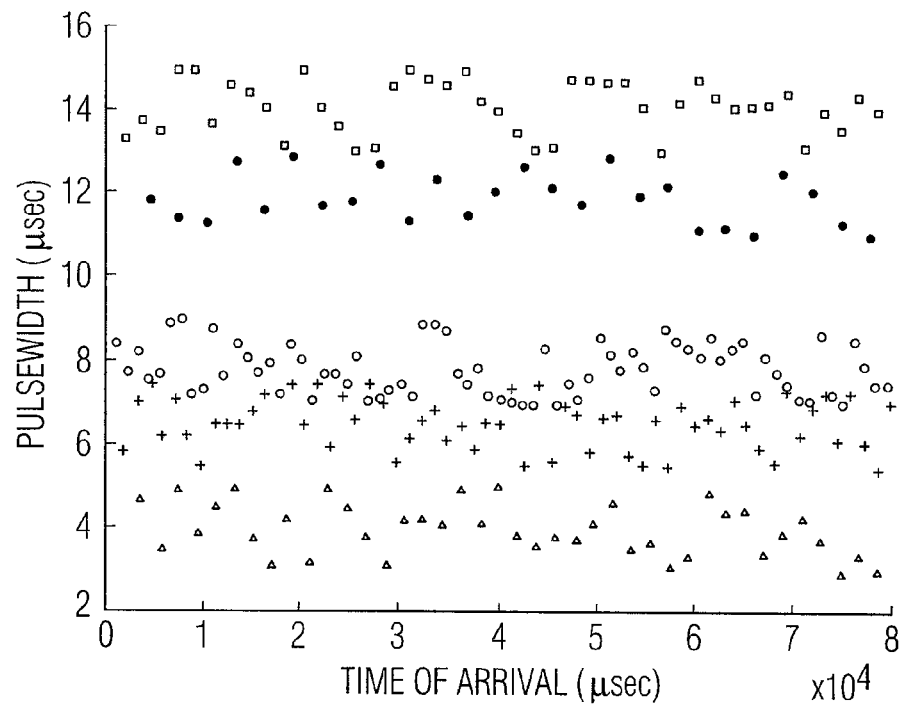

FIG. 9A illustrates an 80 ms snapshot of a radar emitters' RF frequency (RF) versus TOA. The snapshot includes mixes from multiple radar threats, as they may be intercepted by wideband receiver 410, as shown in FIG. 4. FIG. 9B illustrates a snapshot of the radar emitters' pulse width (PW)

versus TOA. These figures indicate that radar pulses from multiple threats are overlapped in RF, and PW.

Figure 10A:
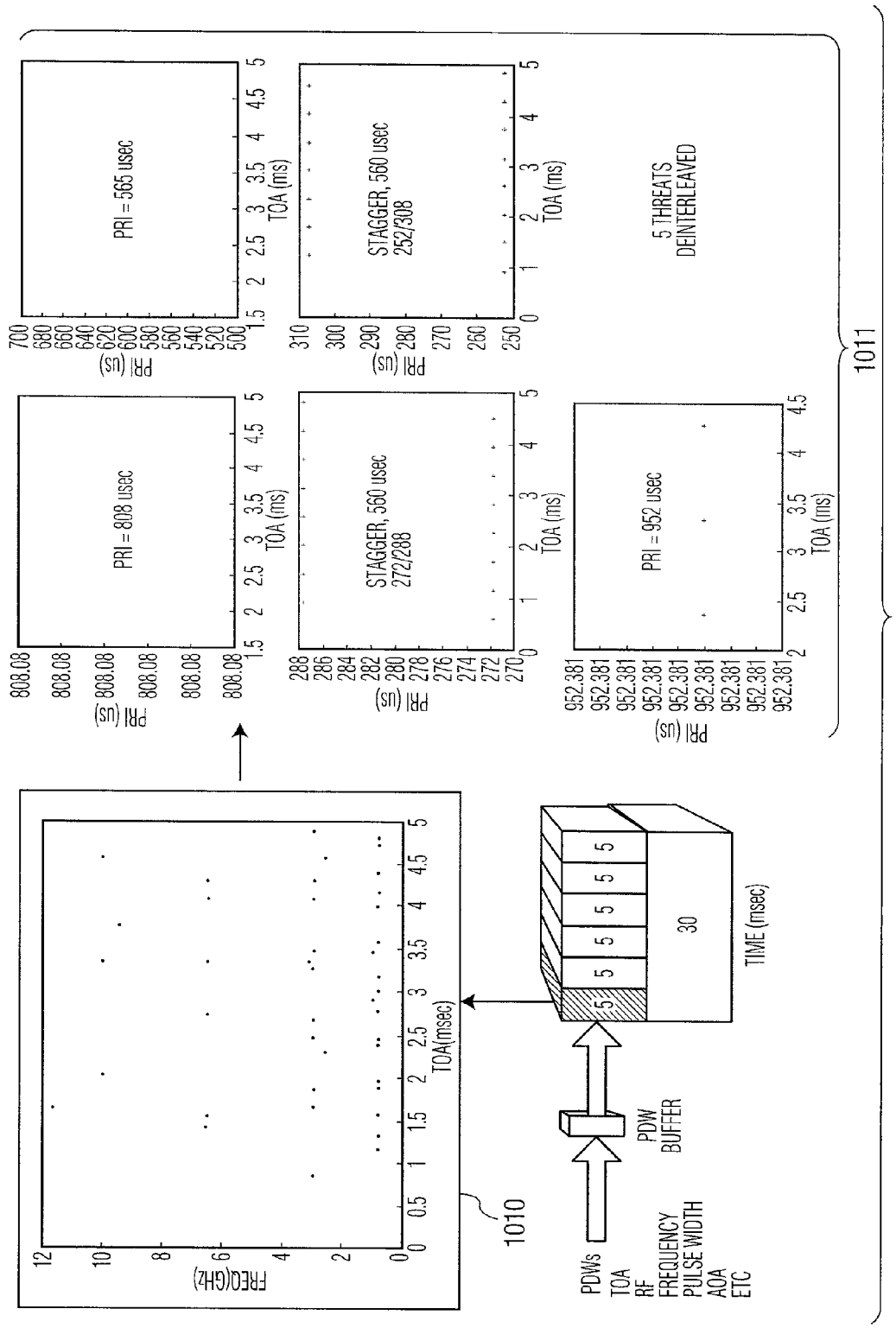
FIG. 10A is an exemplary plot showing PDWs of radar signals received during a first time frame of 5 ms duration and PDWs of radar signals associated with five sources or threats identified in the first time frame, in accordance with an embodiment of the invention.

FIG. 10A illustrates a chart 1010 of the pulses from the 80 ms snapshot of FIG. 9A received during the time frame spanning from 0 to 5 ms (a "first time frame"). The pulses illustrated in chart 1010 are stored in 5 ms buffer 116a of system 100 for processing. FIG. 10A illustrates that five threats 1011 are detected and de-interleaved by processing module 124b of system 100 during the first time frame.

Figure 10B:
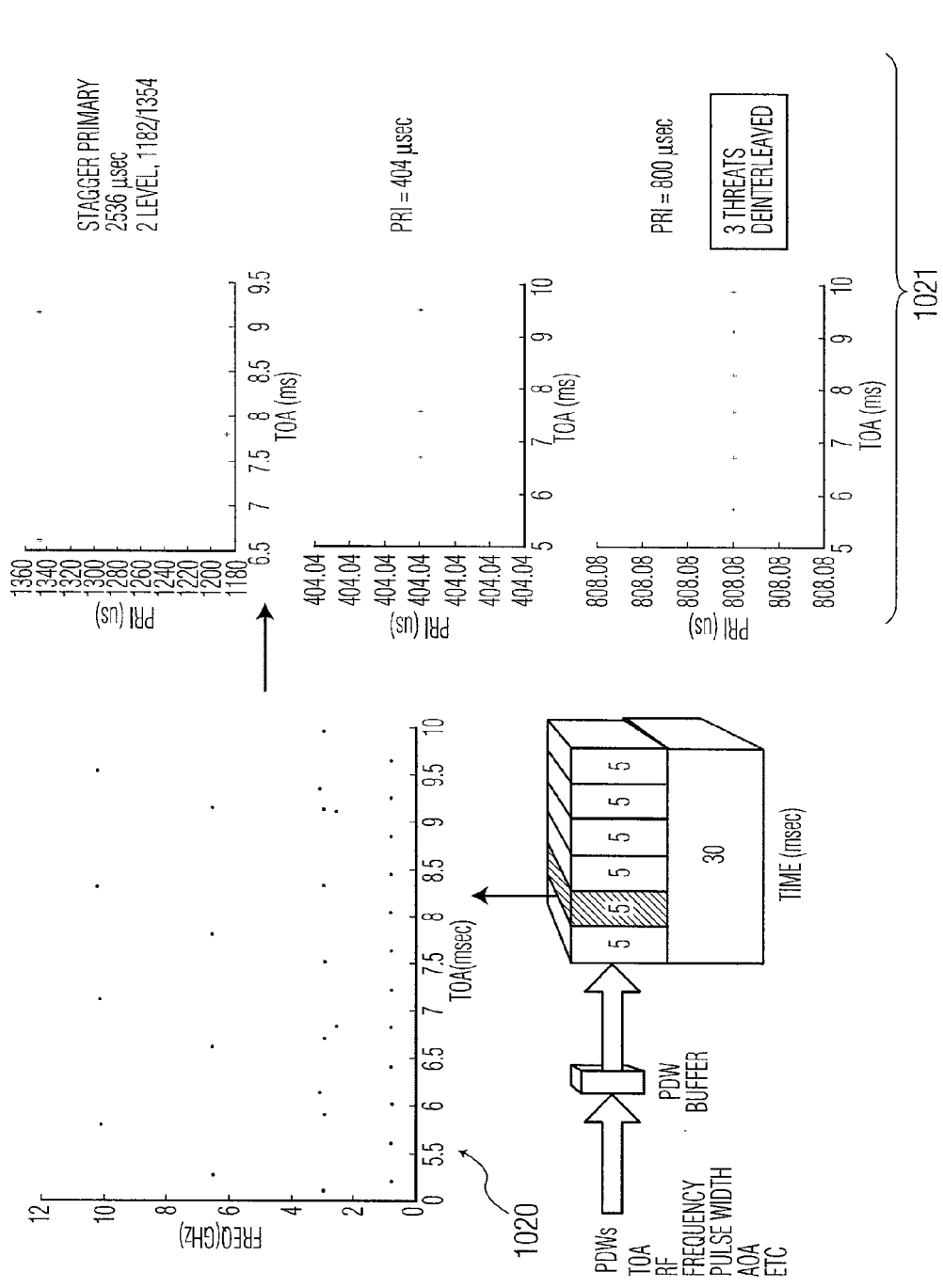
FIG. 10B is an exemplary plot showing PDWs of radar signals received during a second time frame of 5 ms duration and PDWs of radar signals associated with three sources or threats newly identified in the second time frame, in accordance with an embodiment of the invention.

FIG. 10B illustrates a chart 1020 of the pulses stored within buffer 116a corresponding to pulses received between 5 and 10 ms (a "second time frame") and remaining following the removal of pulses received during that time frame and corresponding to already tracked threats. Thus, FIG. 10B illustrates the pulses corresponding to as-of-yet unidentified threats remaining in 5 ms buffer 116a prior to processing in module 124 of FIG. 1. FIG. 10B illustrates that three newly identified threats 1021 are detected and de-interleaved by processing module 124b during the second time frame.

Figure 10C:
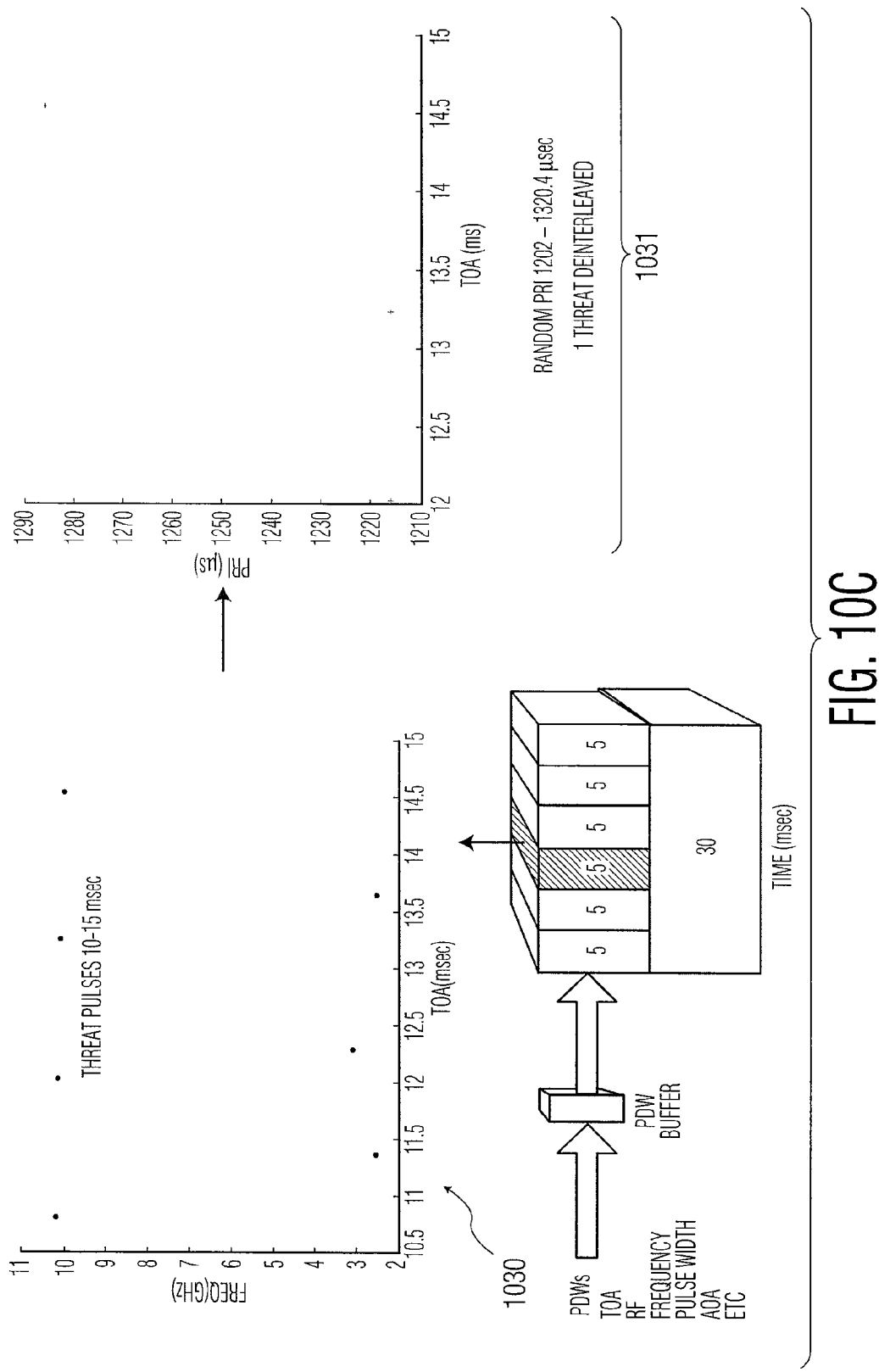
FIG. 10C is exemplary plot showing PDWs of radar signals received during a third frame of 5 ms duration and PDWs of radar signals associated with one source or threat newly identified in the third time frame, in accordance with an embodiment of the invention.

FIG. 10C illustrates a chart 1030 of the pulses stored within buffer 116a corresponding to pulses received between 10 and 15 ms (a "third time frame") and remaining following the removal of pulses received during that time frame and corresponding to already tracked threats. Thus, FIG. 10C illustrates the pulses corresponding to as-of-yet unidentified threats remaining in 5 ms buffer 116a prior to processing in module 124 of FIG. 1. FIG. 10C illustrates that one newly identified threat 1031 is detected and de-interleaved by processing module 124b during the third time frame.

Figure 10D:
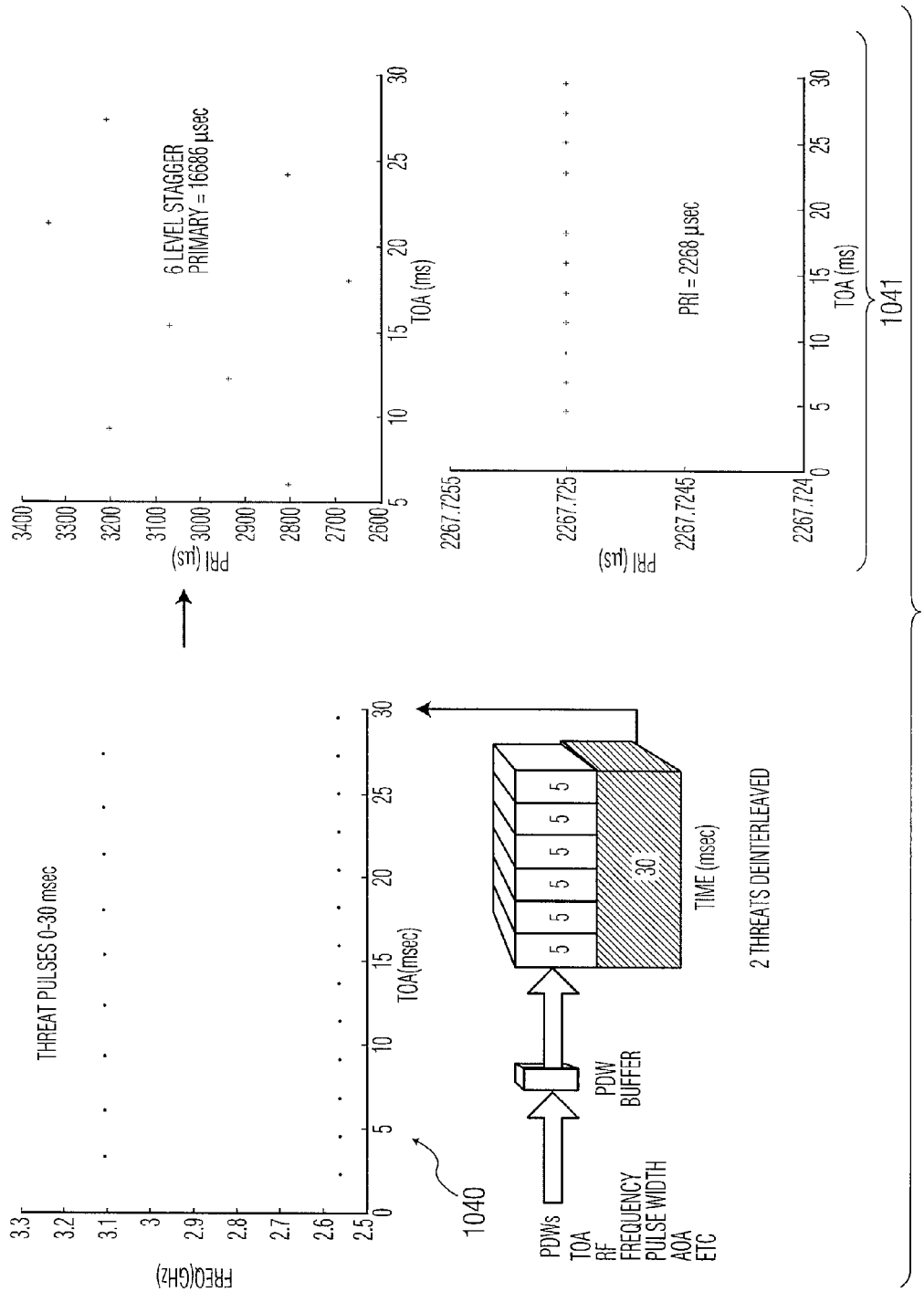
FIG. 10D is an exemplary plot showing PDWs of radar signals associated with a 30 ms time frame and PDWs of radar signals associated with two sources or threats newly identified in the 30 ms time frame, in accordance with an embodiment of the invention.

FIG. 10D illustrates a chart 1040 of the pulses stored within buffer 116b corresponding to pulses received between 0 and 30 ms (a "a 30 ms time frame") and remaining following the removal of pulses received during each of the 5 ms time frames that compose the 30 ms time frame. Thus, FIG. 10D illustrates the pulses corresponding to as-of-yet unidentified threats remaining in 30 ms buffer 116b prior to processing in module 132 of FIG. 1. FIG. 10D illustrates that two newly identified threats 1041 are detected and de-interleaved by processing module 132 from 30 ms buffer 116b during the 30 ms time frame.

Figure 6:
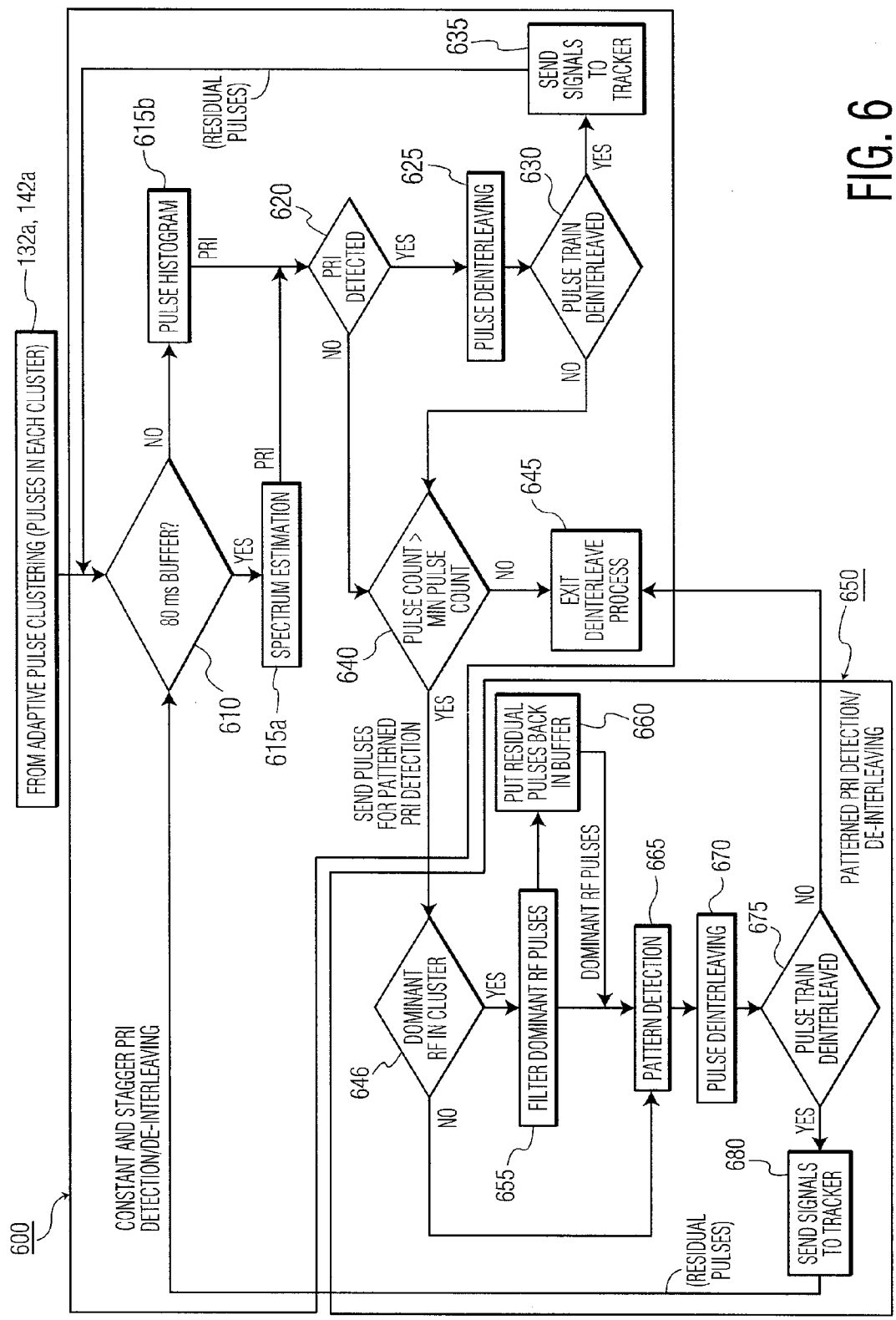
FIG. 6 is a functional flow diagram of a constant and staggered pulse repetition interval (PRI) detection algorithm performed by an adaptive PRI detection module and of a de-interleaving process performed by a de-interleaving module, in accordance with an embodiment of the present invention.

Referring next to FIG. 6, the output pulses from each cluster, 1 to N, from adaptive threat clustering modules 132a and 142a (also illustrated in FIG. 1) are provided to constant and staggered PRI detection/de-interleaving module 600. It will be appreciated that module 600 detects and de-interleaves pulses that are determined to be of a constant PRI. If the pulses are determined to be of a staggered PRI, then the method branches to the patterned PRI detection/de-interleaving module 650.

Decision box 610 determines whether the buffer being processed corresponds to a 30 ms snapshot or an 80 ms snapshot. If decision box 610, determines the buffer being processed corresponds to an 30 ms snapshot, i.e., if buffer 116b is being processed, then module 610 sends the pulses to pulse histogram module 615b to determine the PRIs of the pulses. If, on the other hand, the buffer being processed corresponds to a 80 ms snapshot, i.e., if buffer 116c is being processed, then module 610 sends the pulses to spectrum estimation module 615a to determine the PRIs of the pulses.

Generally, the pulse histogram method is used to determine the PRI of an emitter when the number of pulses being processed is low, as in the case of staggered pulses. Thus, the pulse histogram method is used to process pulses in a 30 ms snapshot and not in an 80 ms snapshot. The spectrum estimation method is used to determine the PRI of an emitter when the number of pulses to be processed is high. Thus, the spectrum estimation method is used to process pulses in an 80 ms snapshot as opposed to a 30 ms snapshot.

If a potential radar PRI is found, as decided by decision box 620, after having been determined by spectrum estimation module 615a or by pulse histogram module 615b, then the determined pulse is sent to pulse de-interleaving module 625. Each individual pulse in pulse de-interleaving module 625 is sorted statistically to determine whether (1) the pulse belongs to a pulse train already existing and/or defined, (2) the pulse is a member of a new pulse train to be formed, or (3) the pulse is a noise spike and should be ignored.

If the resulting pulse is considered to belong to a single radar threat and, consequently, is considered de-interleaved, as determined by decision box 630, then module 600 sends the pulse to the signal trackers by way of module 635. If the pulse has not been de-interleaved, however, as determined by decision box 630, then the pulse is sent into decision box 640. The assumption at this point is that the pulse belongs to a patterned type of pulse emitter and the patterned PRI detection/de-interleaving module 650 is utilized.

Decision box 640 determines whether the pulse count is greater than a second predetermined threshold, or a minimum pulse count threshold. If the pulse count is less than the predetermined minimum pulse count threshold, then the system exits the de-interleaving process by way of module 645. If the pulse count is determined to be greater than the minimum pulse count threshold, on the other hand, then the pulses are sent to the patterned PRI detection/de-interleaving module, generally designated as 650.

The minimum pulse count is the number of pulses used in the decision logic in determining when to exit the de-interleaving process. Exiting the current de-interleaving process is a result of insufficient number of pulses to make a confident estimate of the radar threat signal parameters. The minimum pulse count is a constant and is derived by statistics of expected radar threat parameters in the environment. It is tailored and updated for an individual mission.

For example, the pattern detection algorithm may require 70% of the pulses of a patterned PRI emitter. If the PRI pattern of the emitter ranges from 2 ms to 4 ms, an average of 26 pulses would occur within a 80 ms pulse buffer. The value of the minimum pulse count would then be initialized to process the pattern detection algorithm when at least 18 pulses are available.

The patterned PRI detection/de-interleaving module 650 first determines the dominant RF frequency in the pulses of a particular cluster in the snapshot, by way of decision box 646. If there exists a dominant RF frequency in the cluster, as determined by decision box 646, then the method enters module 655 and filters out the dominant RF frequency pulses. The pattern of the dominant RF frequency pulses are determined by module 665 and pulse de-interleaved by module 670. The pulse train which has been de-interleaved is sent to the signal trackers by way of decision box 675 and module 680.

Returning to module 655, the residual pulses that are not included in the dominant RF frequency are placed back in the buffer, by way of module 660. If there is still another dominant RF frequency, then the pulses of this other dominant RF frequency are also sent into pattern detection module 665 for eventual pulse de-interleaving by module 670. Any left over residual pulses are sent back into module 610 to begin another sequence of the de-interleaving process. Eventually the final pulse count becomes less than the predetermined minimum pulse count threshold (as determined by decision box 640), and the de-interleaving process exits by way of module 645.

It will be appreciated that, in an electronic counter measure (ECM) and/or electronic support measure (ESM) system, radar pulse de-interleaving of intercepted threat pulses is an important part of the electronic warfare (EW) process. The pulse repetition interval (PRI) and other characteristics of a radar threat, as determined by the pulse de-interleaving process, is essential for the ECM/ESM system for conducting threat identification and generating effective countermeasures.

While many approaches to pulse de-interleaving may be possible, techniques based on pulse time-of-arrival (TOA) are implemented by the present invention. These techniques include sequence search and differential TOA histogram.

In a sequence search algorithm, intercepted radar pulses are first collected and formatted in pulse descriptor words (PDW) snapshots. For each snapshot, potential radar pulse trains are formed with PRIs calculated as differences of pulses' TOAs (DTOAs). Each individual pulse in the snapshot is then sorted statistically to determine whether: (1) it belongs to a pulse train already existing and/or defined, (2) it is a member of a new pulse train to be formed, or (3) it is a noise spike and should be ignored. Sequence search algorithms work well in light to medium EW environments, and they are especially effective for de-interleaving pulse trains of fixed and staggered PRI's by way of module 600 of FIG. 6. The performance generally deteriorates, however, when the EW environment becomes increasingly dense.

In addition to differential TOA histogram, other techniques for de-interleaving fixed and staggered PRI pulse trains are implemented by the present invention. These techniques include spectrum estimation and Hough transform. A general description for applying these techniques are described in the following paragraphs. Although not illustrated in FIG. 6, the Hough transform may be computed in parallel with the pattern detection performed by module 665.

In the differential TOA histogram, each pulse's TOA is subtracted from every subsequent TOA of a pulse within the same snapshot. Then counts of differential TOA are accumulated to form the histogram. Applying this technique to a fixed PRI sequence results in high counts at integral multiples of the PRI. The integral multiples can easily be removed, when they are determined to be harmonics of the fundamental PRI.

When several pulse trains are present, however, counts occur at multiples, sums and differences of all possible PRIs, providing ambiguous results. In order to correctly identify a fixed PRI, sufficient counts at each multiple of the PRI must be observed. A threshold above which the sequence is determined to be present must be defined. The threshold should allow for missing and interfering pulses. If the counts at the PRI harmonics are less than the threshold, then the PRI is determined to be only a subinterval and does not form a sequence.

Figure 11:
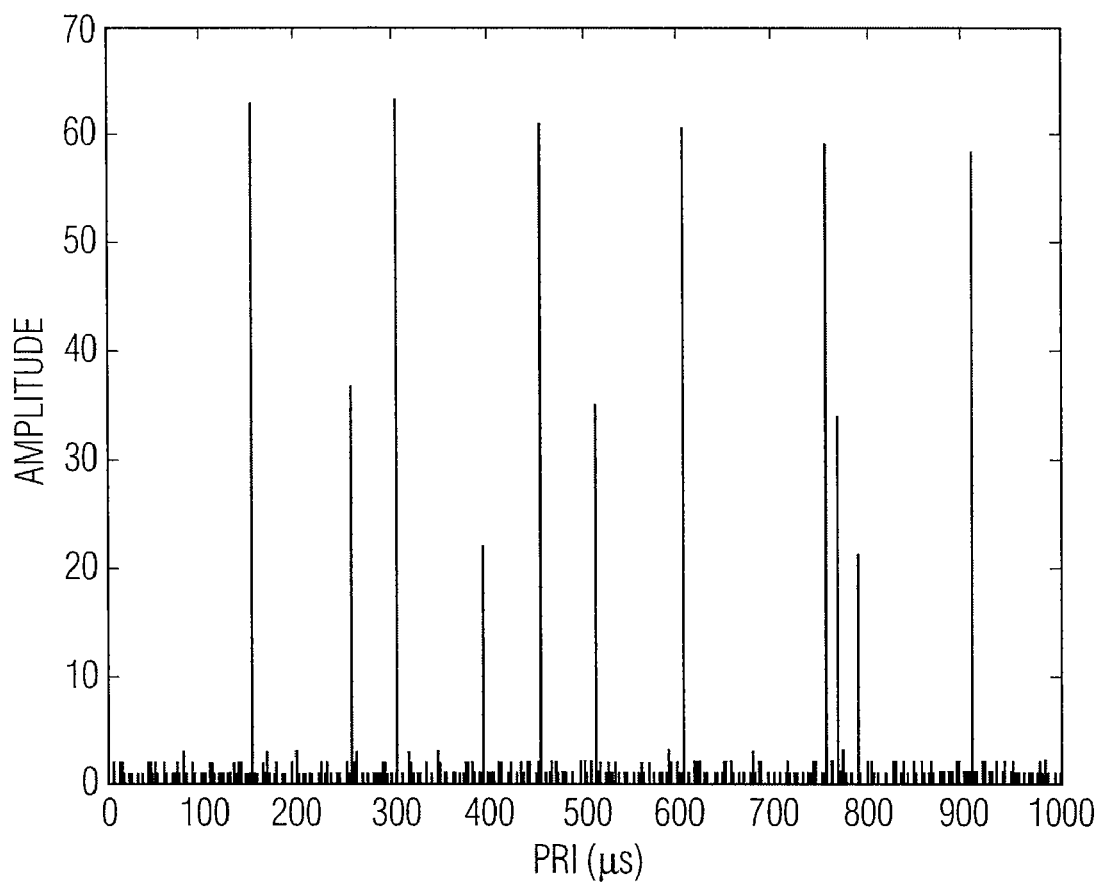
FIG. 11 is an exemplary illustration of a raw differential time of arrival (DTOA) histogram showing three pulse trains with different PRIs, used in accordance with an embodiment of the present invention.
Figure 12:
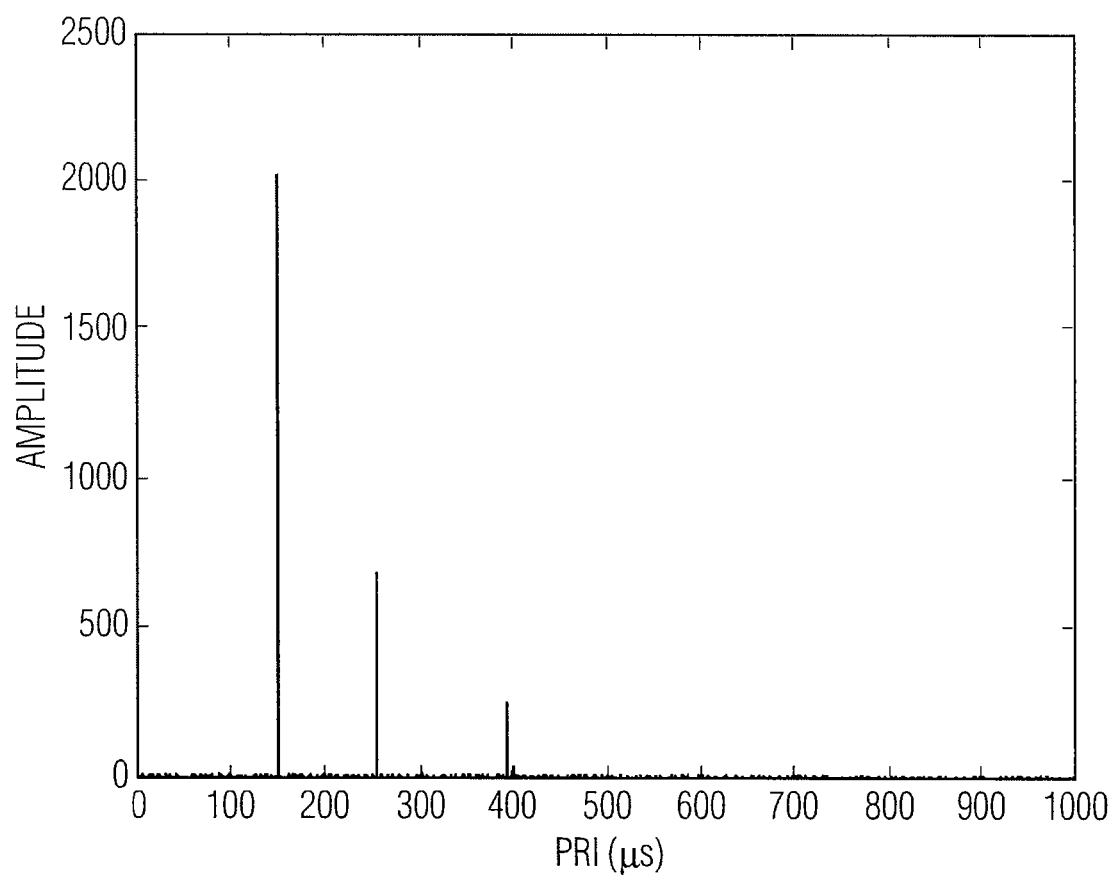
FIG. 12 is a "corrected" histogram of the raw DTOA histogram shown in FIG. 11, used in accordance with an embodiment of the present invention.

As an example of a DTOA histogram, FIG. 11 illustrates the result of a snapshot consisting of three pulse trains with PRIs of 151, 255 and 393 us. FIG. 11 is the raw histogram and FIG. 12 is the "corrected" histogram with all harmonics removed.

The differential TOA histogram does not use sequential information. It simply counts the number of event pairs separated by a given PRI. Neither does it identify the sequence. However, since it is based on subtractions, the DTOA histogram technique offers fast processing.

Figure 7:
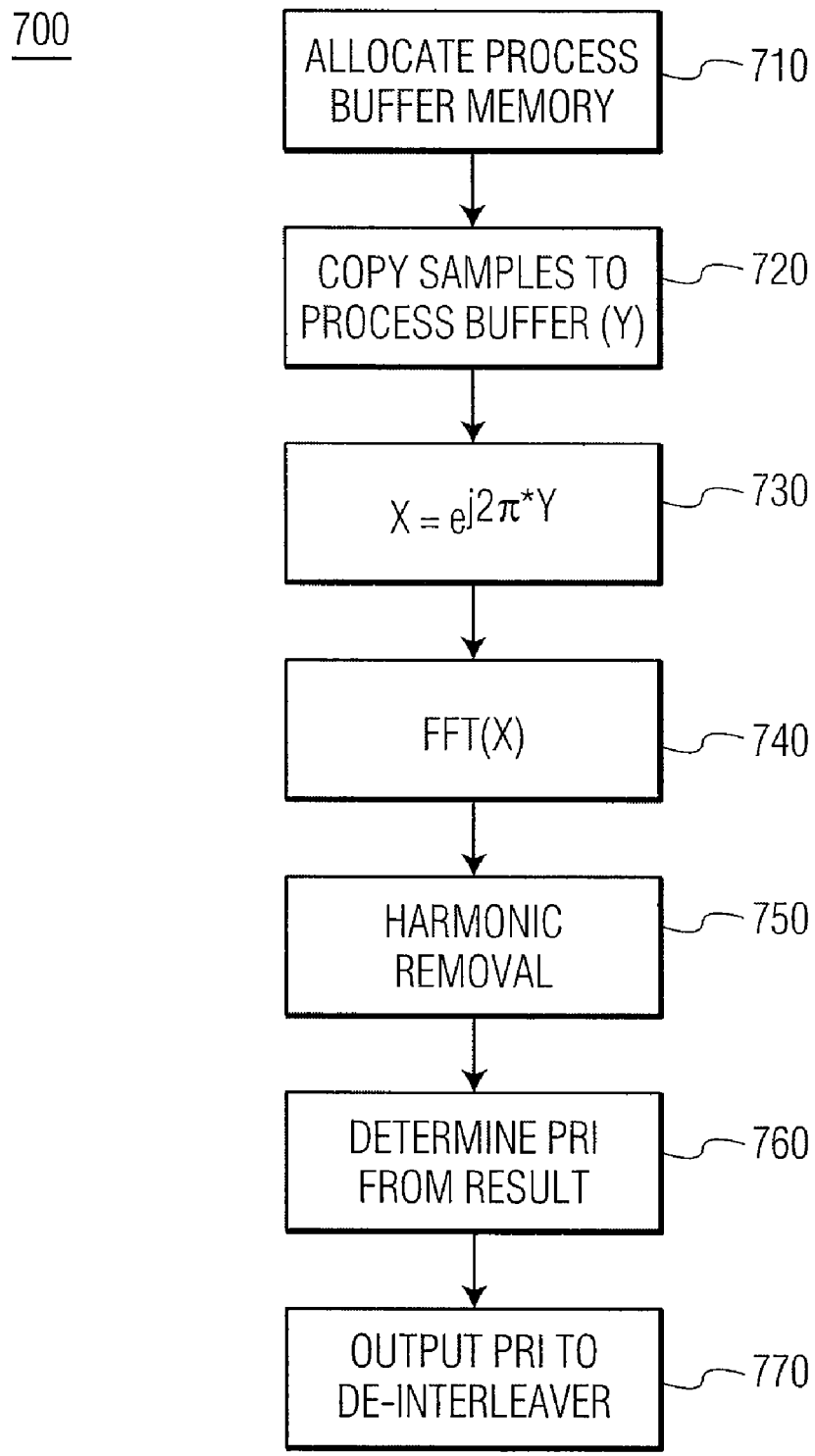
FIG. 7 is a functional flow diagram of a spectrum estimation technique performed by an adaptive PRI detection module, in accordance with an embodiment of the present invention.

The next technique described is the spectrum estimation technique, which is also shown in FIG. 7, generally designated by 700. Spectrum estimation technique 700 is performed by module 615a illustrated in FIG. 6. Rather than trying to de-interleave interleaved pulse trains directly, the spectrum estimation technique focuses on determining the number of pulse trains present in the snapshot and determining the pulse repetition frequency (PRF) of each pulse train.

The method first allocates a buffer in memory (step 710) and copies samples to the buffer (step 720). These samples are shown as Y in step 720 of FIG. 7, and form a complex signal X in step 730. The relationship between Y and X is described below with respect to the complex signal x(n).

Consider, as an example, that there are M periodic pulse trains in a snapshot. Let $T_i$, $f_i$, and $\phi_i$ denote, respectively, the period, frequency and phase of the ith pulse source. The received interleaved signal consists of the superposition of the M pulse trains produced by these sources. Let $t_0, t_1, \ldots t_N$ denote the TOAs of N+1 consecutive pulses in this snapshot. The problem is to determine both the number of pulse trains present and the frequency of each pulse train.

The next step in the method (step 730) is to compose the complex signal x(n):

$$x(n) = e^{j(2\pi/tN)t_n} \text{ for } n = 0, 1, \ldots, N-1$$

The signal x(n) may be thought of as taking the interval [$t_0$, $t_{N-1}$] containing the first N TOAs, normalizing its length to approximately $2\pi$, and then wrapping this normalized interval around a unit circle. Note that in this convention, all TOAs are shifted by subtracting $t_0$, and the first TOA is $t_0 = 0$.

The next step (step 740) is to take the discrete Fourier transform (DFT) of x(n). The magnitude of the DFT contains all necessary information to determine how many pulse trains are present and their frequencies. By choosing appropriate data lengths, the DFT can easily be adapted to a fast Fourier transform (FFT) operation. Hence the computational cost of the technique is of the order of $N \log(N)$, as compared to $N^2$ for a sequence search algorithm technique.

In step 750, the method conducts an additional process of removing possible harmonics of a detected PRF. If $f_1$ is a pulse train frequency, then harmonics of $f_1$, (such as $2f_1$, $3f_1 \ldots$,) will also exist in the spectrum and must be removed. For multiple pulse trains, in addition to its own harmonics, any combinations of individual PRFs must also be removed when they are in the range of interest.

Figure 13:
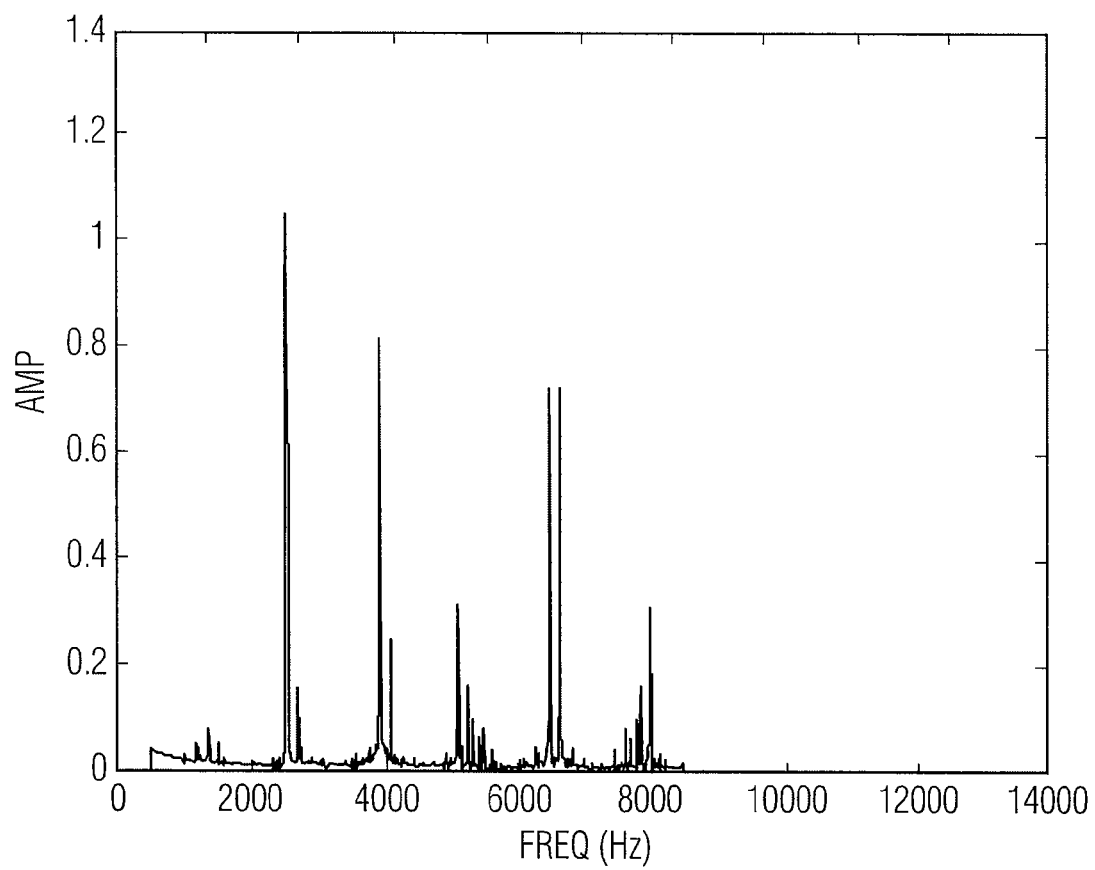
FIG. 13 is a plot of a raw fast Fourier transform (FFT) of TOAs of an input snapshot, used in accordance with an embodiment of the present invention.
Figure 14:
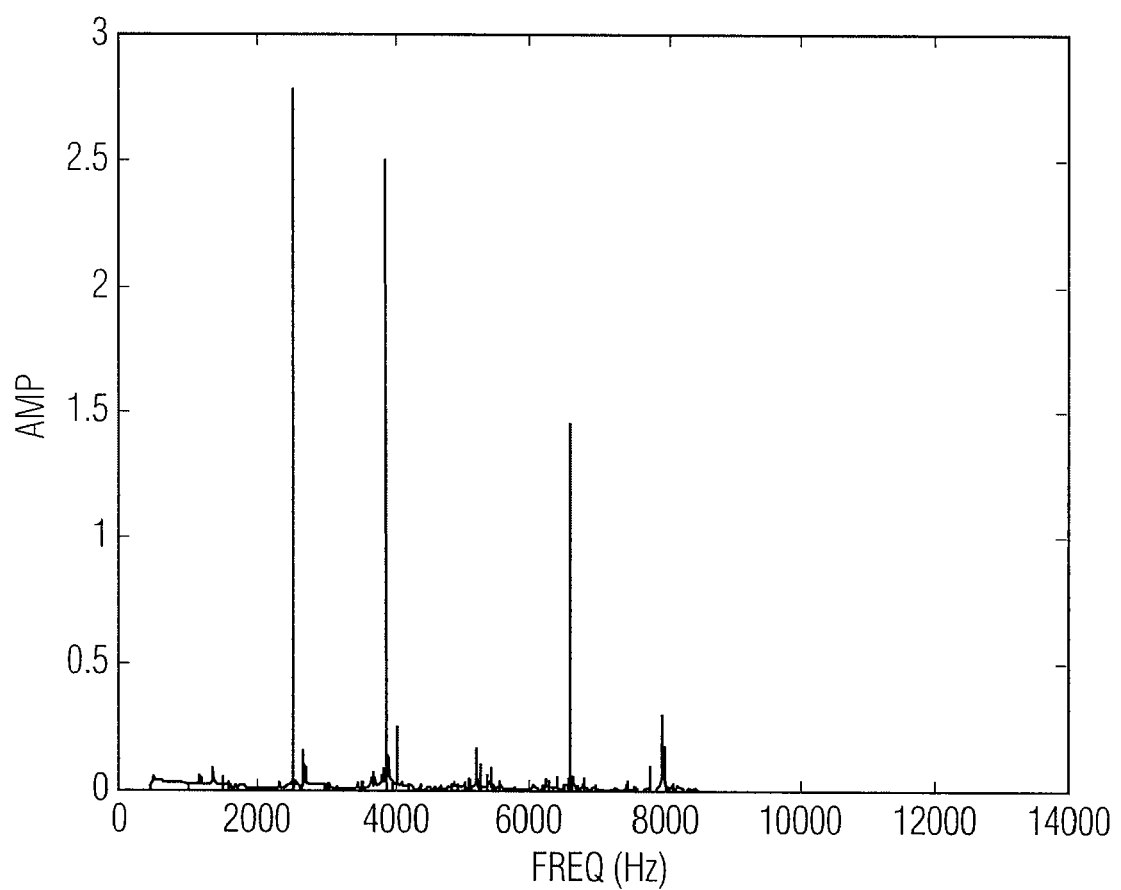
FIG. 14 is a corrected FFT of the TOAs of the input snapshot shown in FIG. 13, used in accordance with an embodiment of the present invention.

As an example, FIGS. 13 and 14 illustrate the result of the spectrum estimation of the same snapshot including three pulse trains having PRIs of 151, 255 and 393 us. FIG. 13 is the raw spectrum and FIG. 14 is the "corrected" spectrum when all harmonics are removed.

Lastly, the spectrum estimation technique determines the PRI, after removing the harmonics of the signal (step 760). The determined PRI is then sent to pulse de-interleaving module 625 in FIG. 6 (step 770).

Figure 8:
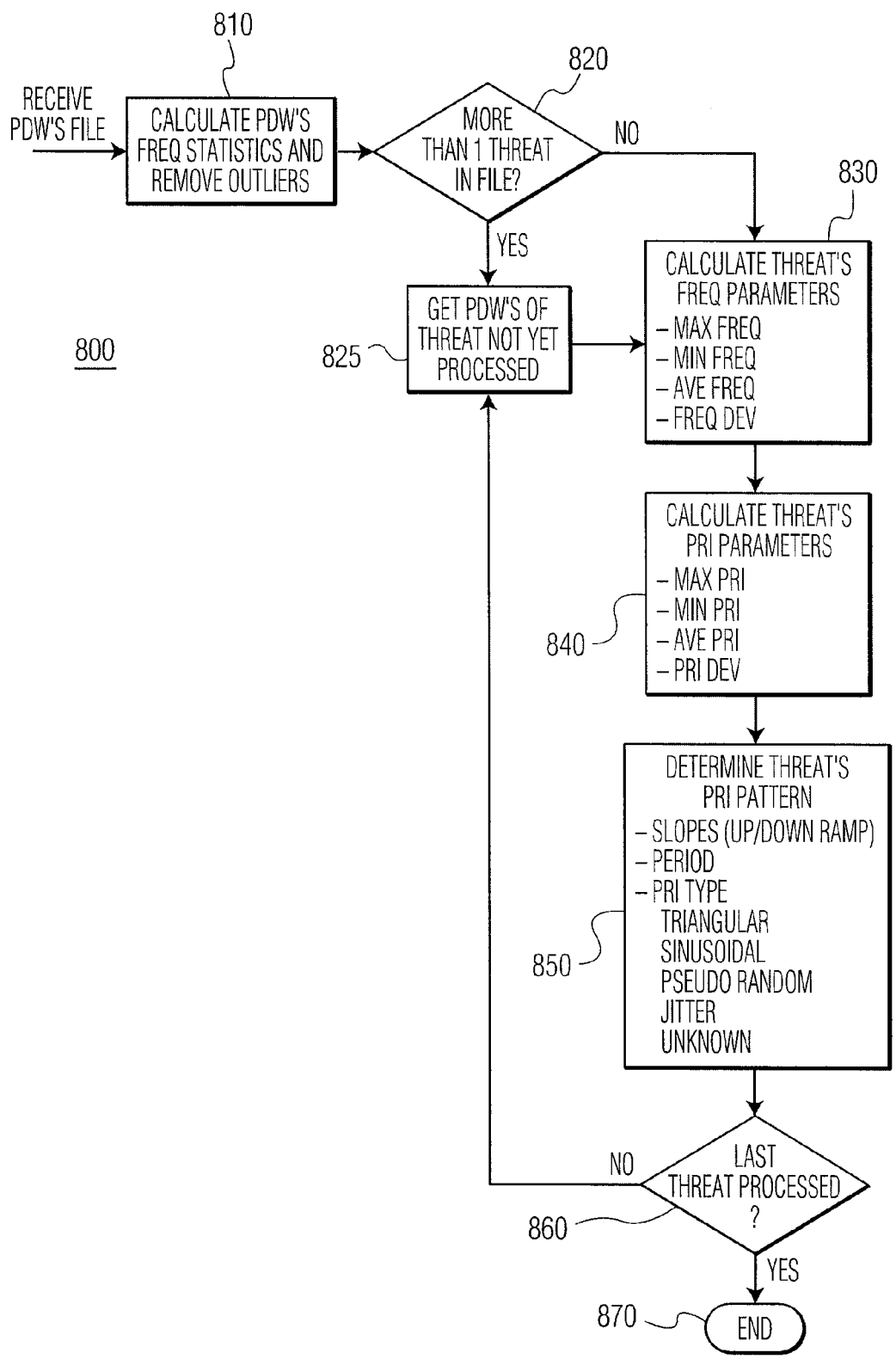
FIG. 8 is a functional flow diagram of a pattern detection technique performed by an adaptive PRI detection module, in accordance with an embodiment of the invention.

The pattern detection module, designated as 665 in FIG. 6, will now be described in greater detail with reference to FIG. 8 where it is designated as 800. Referring to FIG. 8, the method, as executed by module 800, first enters step 81 after the PDW file is received. Step 810 calculates the frequency statistics of the received PDWs. The outlying PDWs are removed from the cluster. Decision box 820 then determines whether more than one threat is in the received PDW file. If only one threat is found in the received PDW file, then the method branches to step 830, otherwise it branches to step 825. Step 830 calculates various threat frequency parameters of the received PDW threat file. Such parameters include maximum frequency, minimum frequency, average frequency and frequency deviation. The method next enters step 840 to calculate various parameters for the threat's PRI. Such parameters include the maximum PRI, the minimum PRI, the average PRI and the PRI deviation.

Entering step 850, the method determines the threat's PRI pattern. Such pattern may include a slope (up/down ramp), such as a triangular slope. The pattern may also be sinusoidal, pseudo random, jitter or unknown. If the last threat has been processed, as determined by decision box 860, then the method ends in step 870. If, on the other hand, this is not the last threat processed, then the method branches to step 825. Step 825 obtains the PDWs of threats that have not yet been processed and the method repeats steps 830, 840 and 850. This process is repeated until all threats have been processed to end the method in step 870.

The next technique described is the Hough transform technique, which is an image processing technique for finding linear lines in a 2D image. The Hough transform is used by the present invention to detect radar pulse trains. To apply the Hough transform, the 1D TOA data in a snapshot must first be converted into a 2D image.

Figure 15:
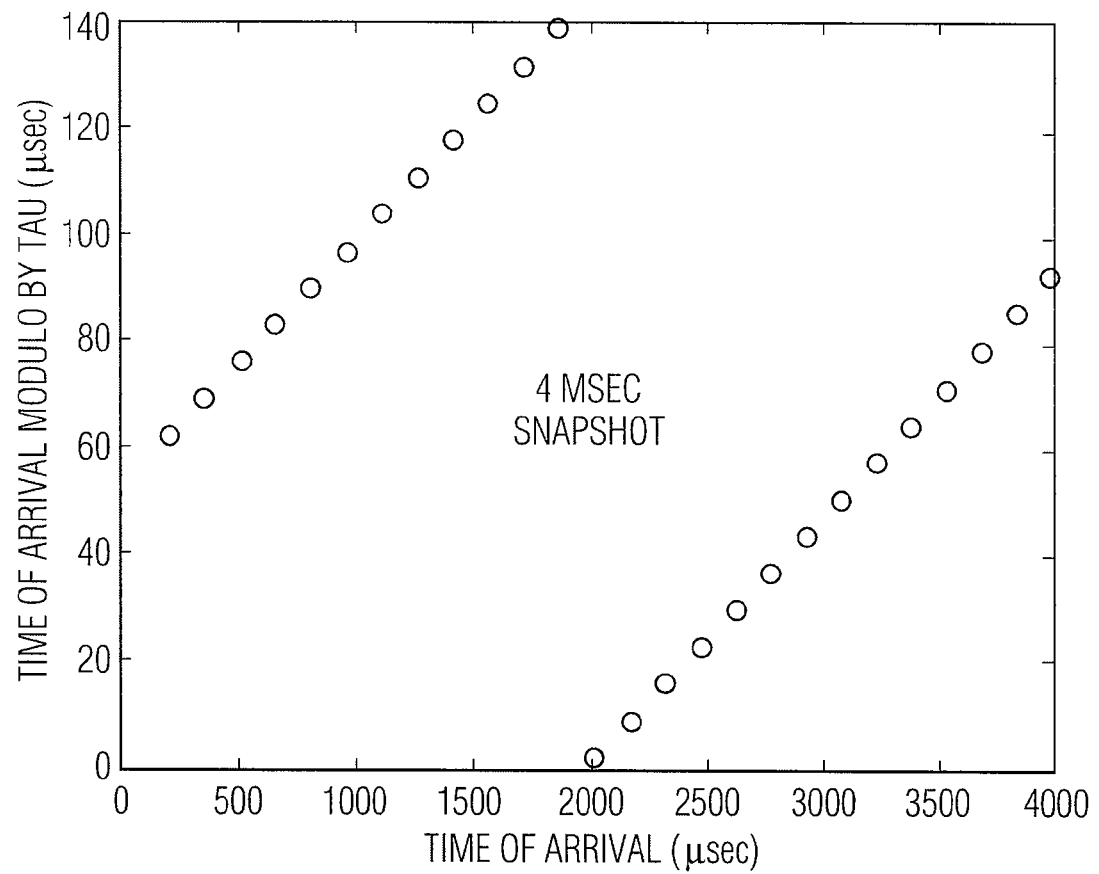
FIG. 15 is a waterfall plot of threat pulses interleaved in a 5 ms snapshot, used in accordance with an embodiment of the present invention.

As an example, assume there is only one pulse train present in a snapshot. When the TOA in a snapshot is plotted against TOA modulo by $\tau$, where $\tau$ is an arbitrary window width, a waterfall plot results. All data points (x, y) in the plot representing TOAs trace a sloped linear line $x=y+k\tau$. This line wraps back as it exceeds the window width $\tau$. FIG. 15 illustrates such a waterfall plot, when the PRI of the radar pulse train is 151 us, and $\tau$=144 us. The snapshot time is 4 ms.

Conversely, given a set of points on a line of gradient m of a waterfall plot, the PRI can also be determined. A particular gradient m would correspond to a class of PRIs, all harmonically related. The least of these $PRI_f$ is related to $\tau$ and m as follows:

$$m=(PRI_f-\tau)/PRI_f, \text{ and}$$

$$PRI_f=\tau/(1-m)$$

In a 2D binary image, the Hough transform is defined as:

$$\rho = x \cos\theta + y \sin\theta$$

The (x, y) is a rectangular coordinate of a data point where the image is not "0". The location is then transformed into ($\rho$, $\theta$) in a polar coordinate (or the intercept-gradient space). If data points $(x_1, y_1), (x_2, y_2), \ldots (x_N, y_N)$ are all on the same line $x=y+k\tau$, then their Hough transforms of $\rho=x_i \cos\theta+y_i \cos\theta$, $\tau=1, 2, \ldots N$, will all pass through the same point $(\rho_c, \theta_c)$ where $\rho_c$ is the distance (or intercept), with a scale factor from the origin to the line $x=y+k\tau$, and $\tan\theta_c$ is the gradient of a linear line in the original rectangular coordinate.

Figure 16:
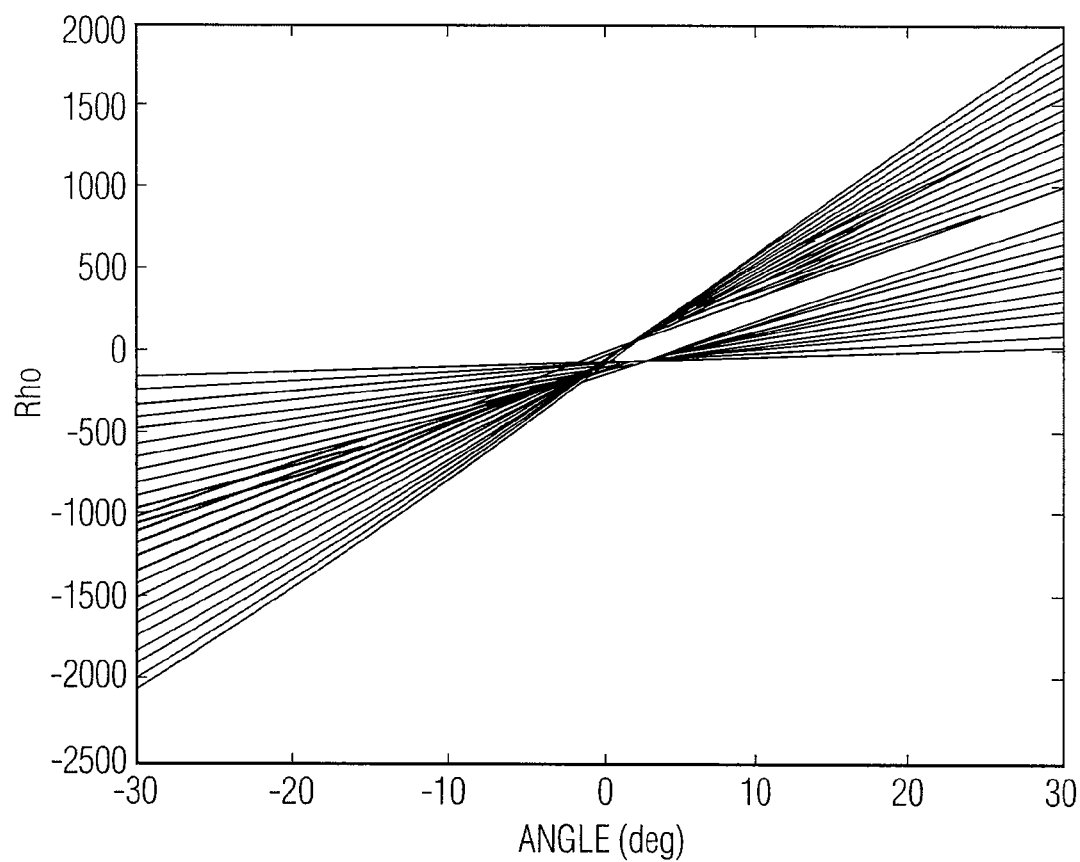
FIG. 16 is a plot of a Hough transform of the waterfall plot shown in FIG. 15, used in accordance with an embodiment of the present invention.

FIG. 16 is the Hough transform of FIG. 15. There are two groups of 12 and 14 lines passing through two focal points with the same gradient m but different intercept points. They correspond to the two sloped lines of the waterfall plot of FIG. 10. Thus, the Hough transform is equivalent to finding the number of points on a given line in a 2D image.

In a practical implementation, the result of a Hough transform must be placed into discrete ($\rho$-$\theta$) resolution bins. The Hough transform of a binary 2D image proceeds as follows:

(1) The intercept-gradient space is nullified and gridded with ($\rho$-$\theta$) bins. The size of the ($\theta$-$\rho$) bin is determined by the resolution required for detecting radar pulse trains.

(2) For each non-zero data point located at an $(x_i, y_i)$, a line $\rho=x_i \cos\theta+y_i \cos\theta$ in the gradient-intercept space is generated. This line is the Hough transform of point $(x_i, y_i)$. All bins on this line are then incremented by one. Since all points $(x_1, y_1), \ldots (x_N, y_N)$ on line $x=y+k\tau$ of the original 2D will pass through a single point $(\rho_c, \theta_c)$, the accumulated "hits" on this ($\rho$-$\theta$) bin will be N.

(3) Since we are only interested in the gradient m of the line, all "hits" along the same gradient bins are added for better threshold detection.

(4) The threshold used for detection is closely related to the probability of detection, the probability of false alarm, the size of the snapshot and the window width $\tau$ used in the Hough transform.

(5) After a gradient m is detected, a radar pulse train with possible PRF of $PRI_f=\tau/(1-m)$ is declared.

As an example, a 4 ms snapshot including three pulse trains having PRIs of 151, 255 and 393 us is used to demonstrate this algorithm. A series of Hough transforms are conducted with three different window widths, $\tau$=144, 263 and 410 us. The results are summarized in FIGS. 17-19.

Figure 17A:
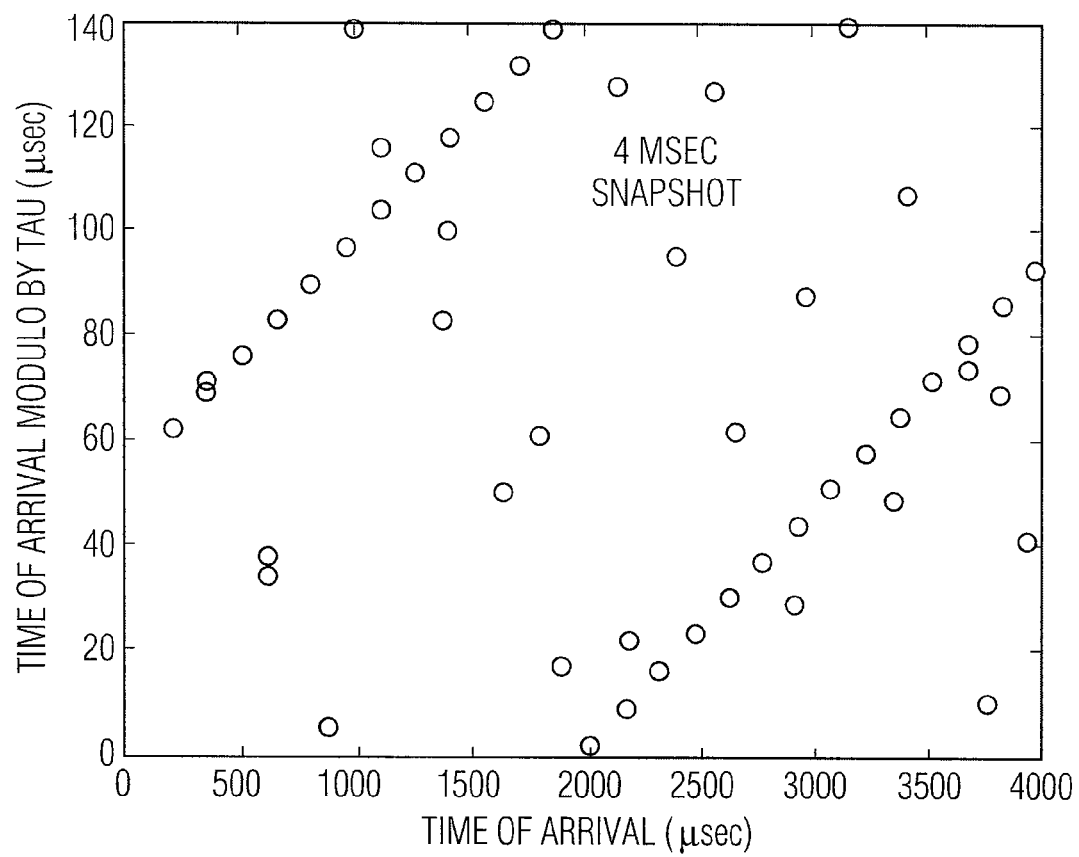
FIGS. 17A, 17B and 17C are, respectively, a waterfall plot of different radar pulses, a Hough transform of the waterfall plot, and a PRI detected by the Hough transform, in accordance with an embodiment of the present invention.
Figure 17B:
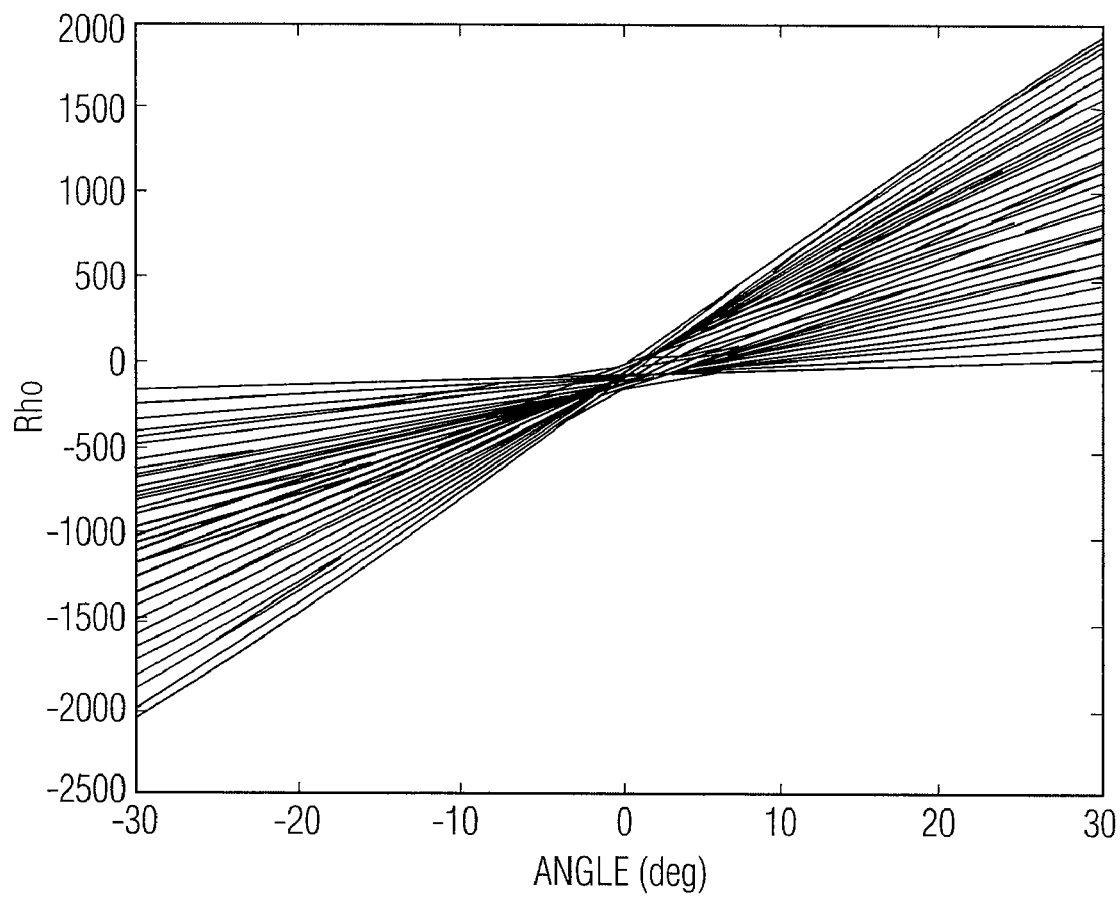
Figure 17C:
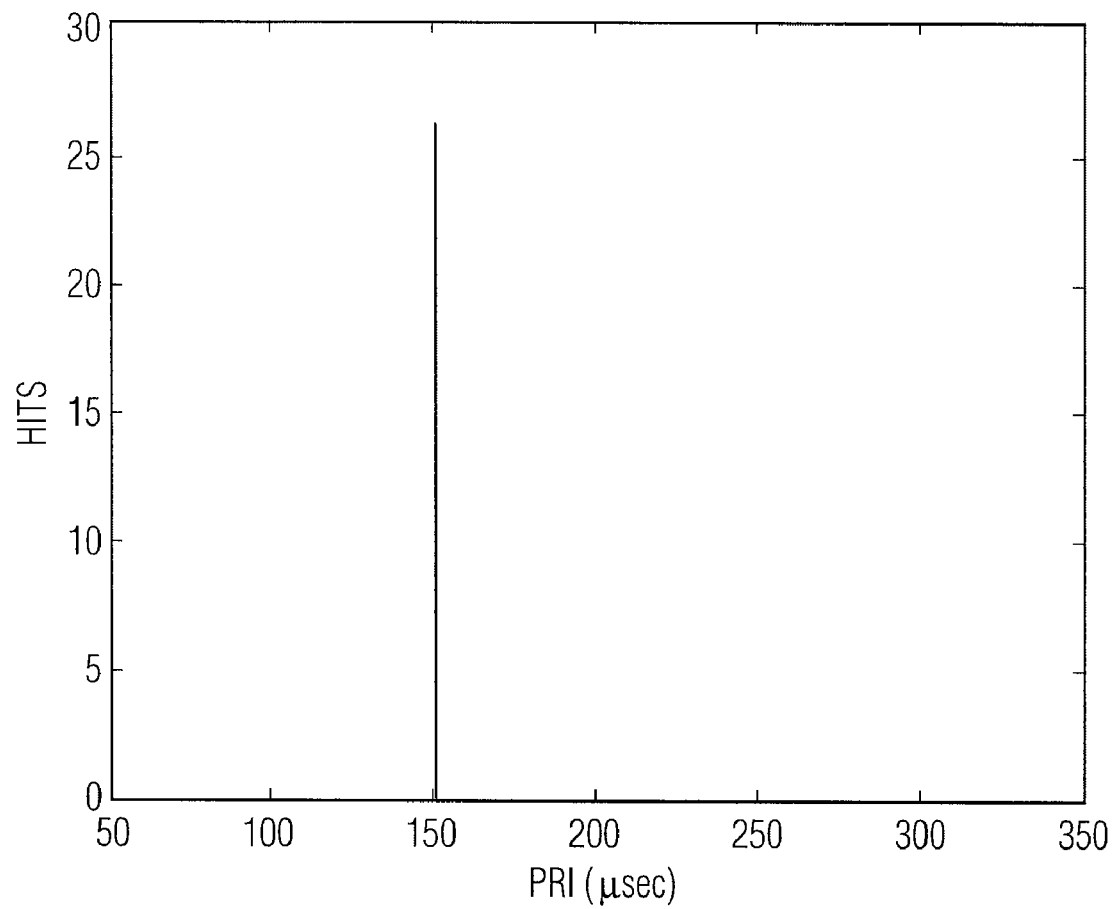

FIG. 17A illustrates the waterfall plot with $\tau$=144 us. The corresponding Hough transform is shown in FIG. 17B, and a radar pulse train with PRI=151 us is detected, as illustrated in FIG. 17C.

Figure 18A:
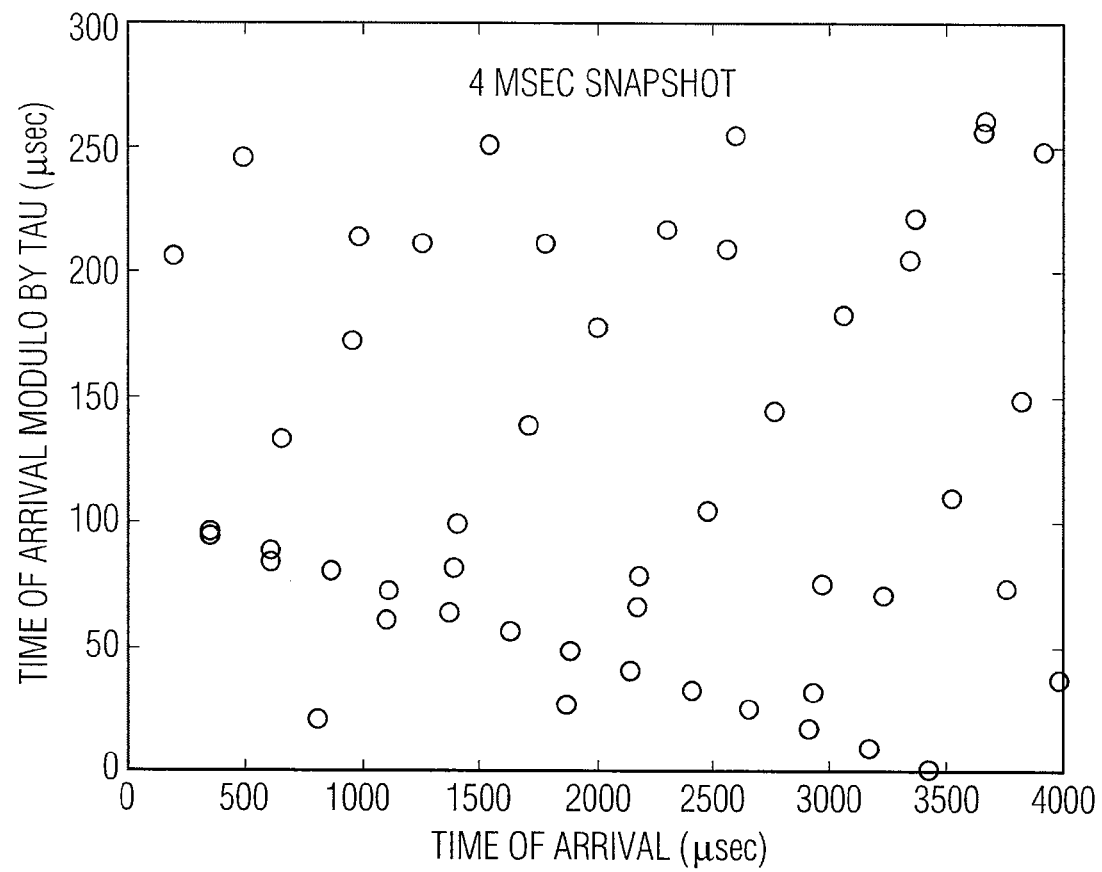
FIGS. 18A, 18B and 18C are, respectively, another waterfall plot of different radar pulses, another Hough transform of the waterfall plot, and another PRI detected by the Hough transform, in accordance with an embodiment of the present invention.
Figure 18B:
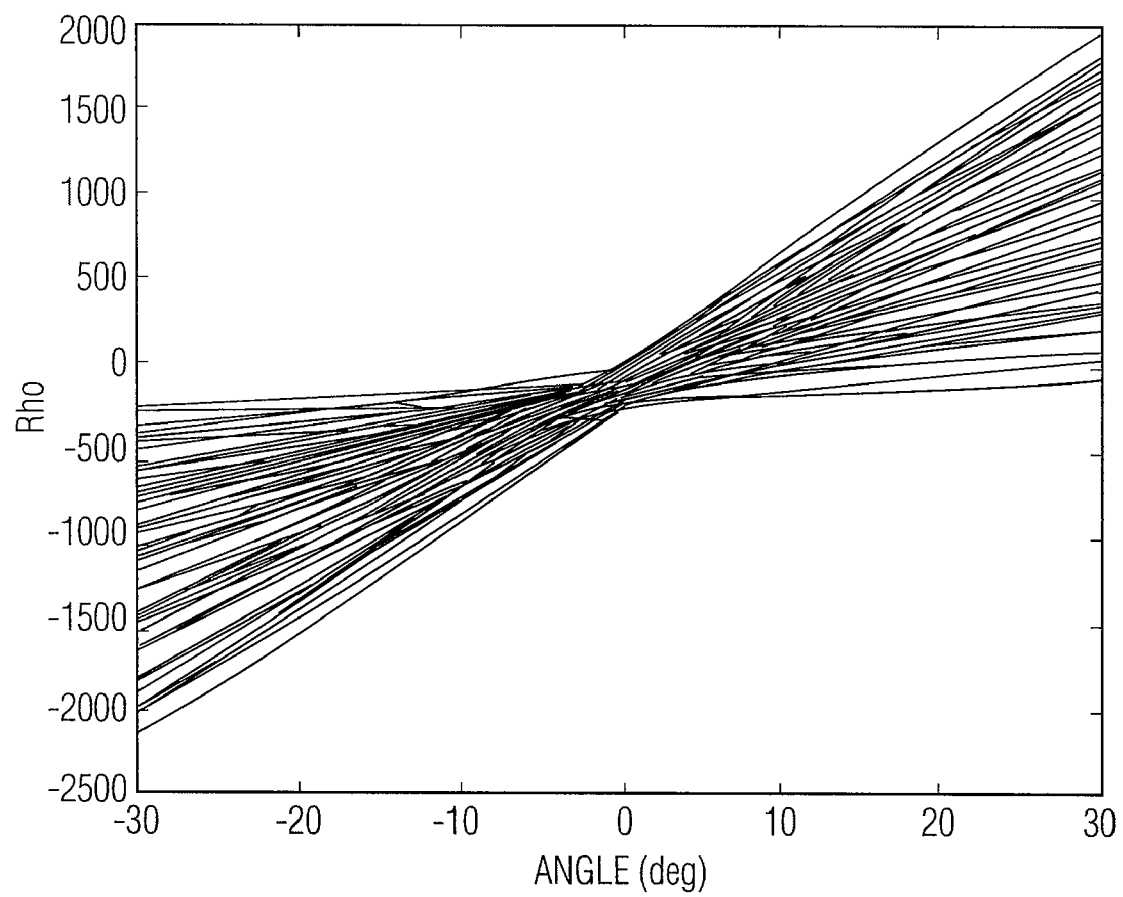
Figure 18C:
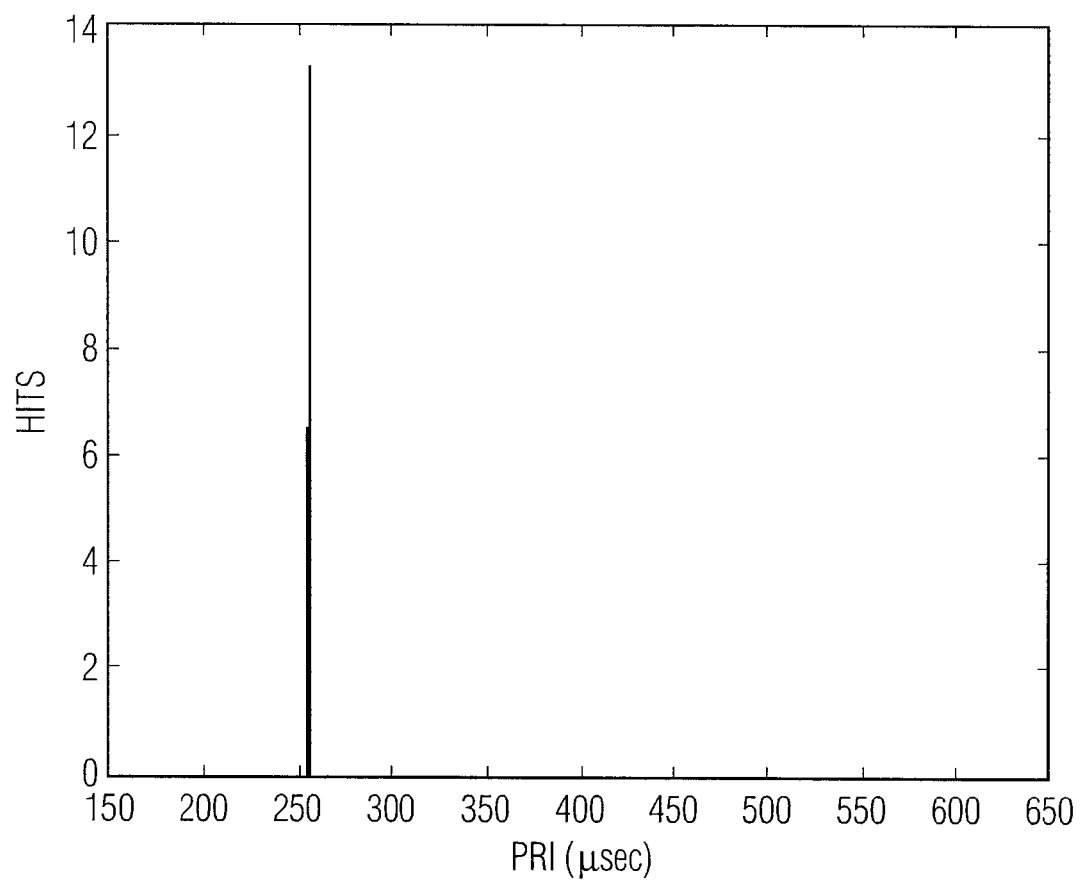

FIG. 18A illustrates the waterfall plot with $\tau$=263 us. The corresponding Hough transform is shown in FIG. 18B, and a radar pulse train with PRI=255 us is detected, as illustrated in FIG. 18C.

Figure 19A:
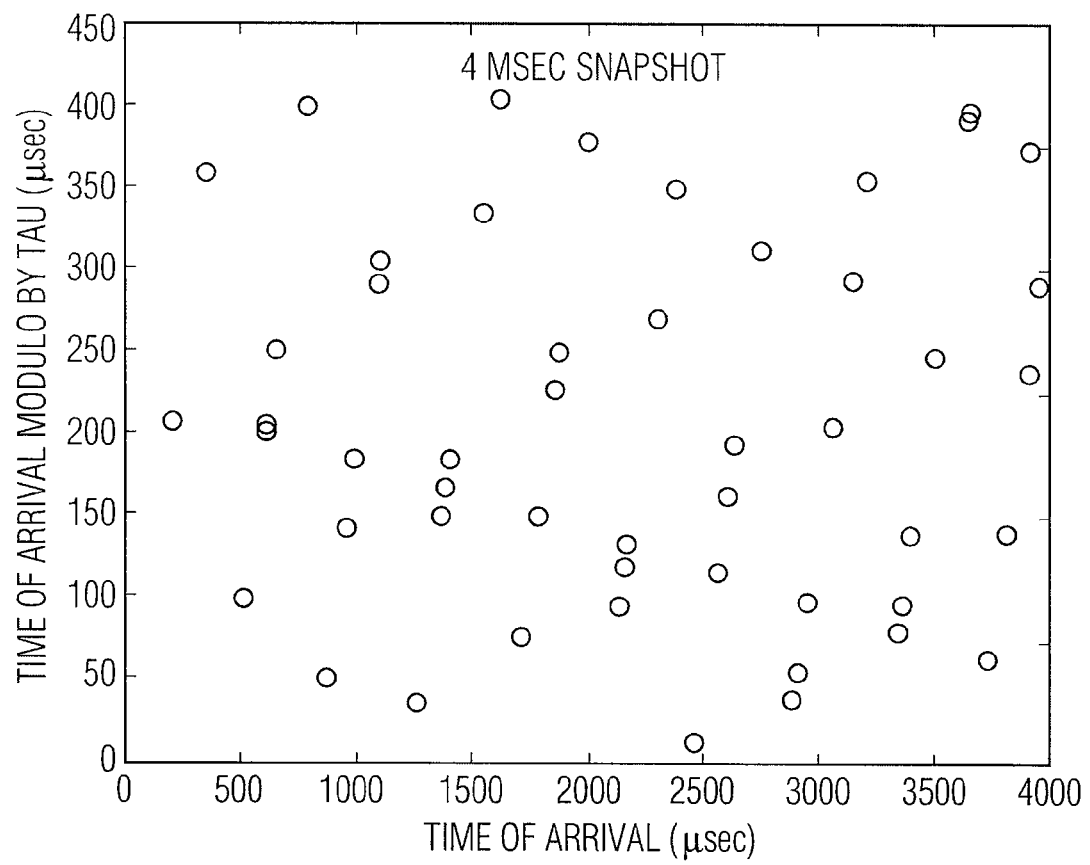
FIGS. 19A, 19B and 19C are, respectively, yet another waterfall plot of different radar pulses, yet another Hough transform of the waterfall plot, and yet another PRI detected by the Hough transform, in accordance with an embodiment of the present invention.
Figure 19B:
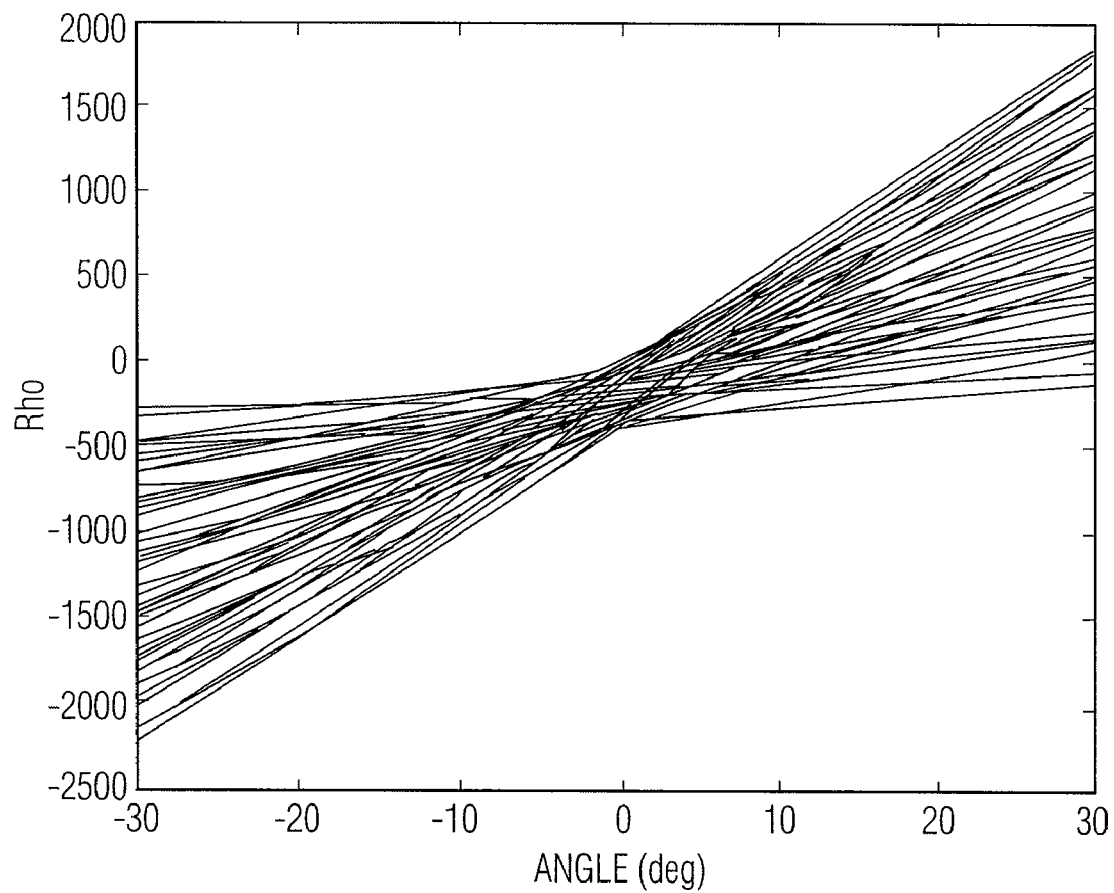
Figure 19C:
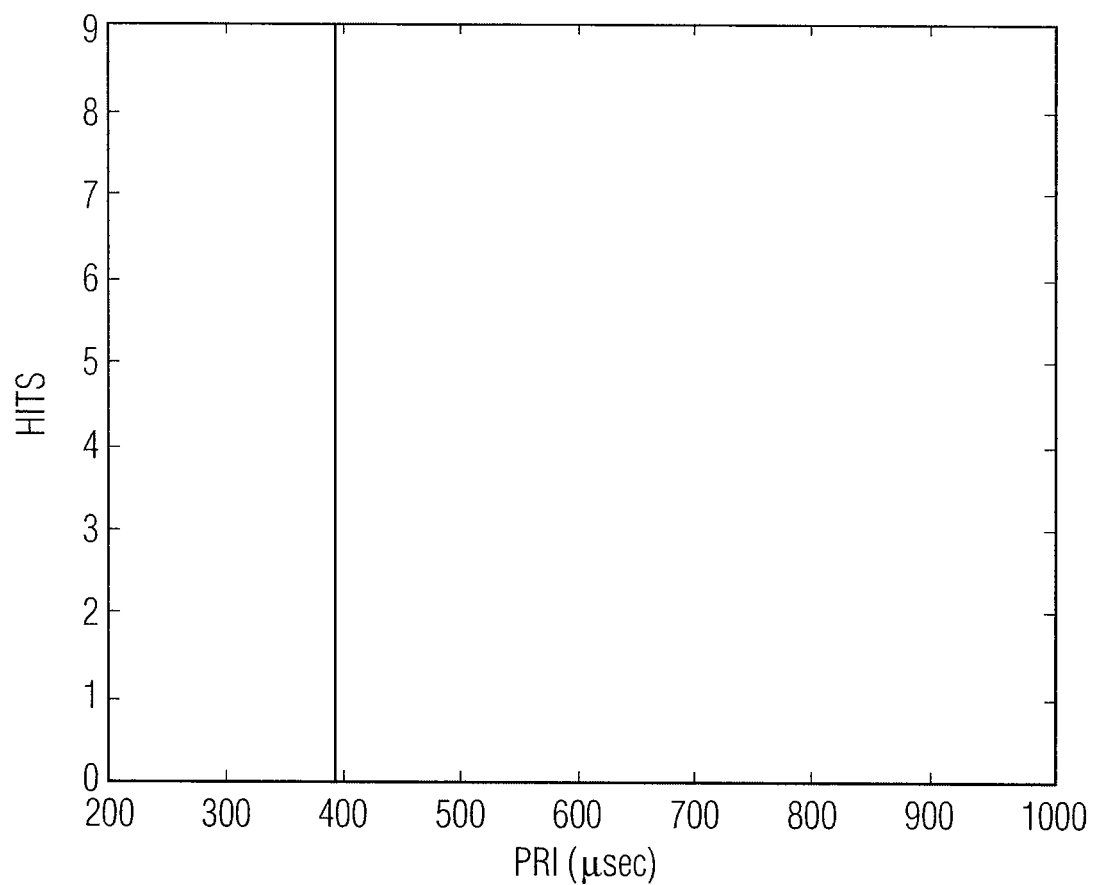

Similarly, FIG. 19A illustrates the waterfall plot with $\tau$=410 us. The corresponding Hough transform is shown in FIG. 19B, and a radar pulse train with PRI=393 us is detected, as illustrated in FIG. 19C.

Thus, all three PRIs are detected with Hough transforms. Although Hough transform is computational intensive, many "fast" Hough transform algorithms are available. There are also VLSI implementations of Hough transform available off-the-shelf, with computation rate better than 1 us per data point.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of classifying radar emitters comprising the steps of:

(a) receiving pulses from multiple radar emitters during a plurality of consecutive first time intervals;

(b) identifying pulses in each of the plurality of consecutive first time intervals corresponding to one or more first pulse trains using a first algorithm and de-interleaving the identified pulses from the plurality of first time intervals;

(c) associating received pulses not identified and not de-interleaved using the first algorithm with a plurality of consecutive second time intervals, each consecutive second time interval formed from two or more consecutive first time intervals; and (d) identifying further pulses in each of the plurality of consecutive second time intervals corresponding to one or more second pulse trains using a second algorithm and de-interleaving the identified further pulses from the pulses associated with the plurality of consecutive second time intervals.

2. The method of claim 1, wherein the step (b) comprises identifying a first train of pulses received from a first radar source in a first time interval in the plurality of consecutive first time intervals using the first algorithm;

establishing a first tracking filter associated with the identified first train of pulses received from the first radar source; and de-interleaving the identified first train of pulses produced by the first radar source from the received pulses in the first time interval.

3. The method of claim 2, wherein the step (b) further comprises
identifying a second train of pulses in a second time interval in the plurality of consecutive first time intervals using the tracking filter, the second time interval following the first time interval in time, the identified second train of pulses produced by the first radar source;
removing the identified second train of pulses from the second time interval;
identifying a further train of pulses received from a second radar source in the second time interval using the first algorithm;
establishing a further tracking filter associated with the identified further train of pulses received from the second radar source; and
de-interleaving the identified further train of pulses produced by the second radar source from the pulses of the second time interval remaining after the second train of pulses produced by the first radar source is removed.

4. The method of claim 3, wherein the first algorithm is a quantized pulse repetition interval (PRI) algorithm.

5. The method of claim 1, wherein the step (d) further comprises
categorizing the pulses in the plurality of consecutive second time intervals based on pulse descriptor words (PDWs);
forming clusters of the pulses in the plurality of consecutive second time intervals based on the PDWs; and
extracting pulses from at least one of the formed clusters based on pulse repetition intervals (PRIs) between the extracted pulses.

6. The method of claim 5, wherein the step of extracting includes de-interleaving pulses from the at least one of the formed clusters using a differential time of arrival (DTOA) histogram technique.

7. The method of claim 5, wherein the step of extracting includes de-interleaving pulses from the at least one of the formed clusters using a pattern recognition technique.

8. The method of claim 1, further comprising the steps of:
(e) associating pulses in the plurality of consecutive second time intervals not identified and de-interleaved using the second algorithm with a plurality of consecutive third time intervals, each consecutive third time interval being formed from two or more consecutive second time intervals; and
(f) identifying still further pulses in each of the plurality of consecutive third time intervals corresponding to one or more third pulse trains using a third algorithm and de-interleaving the still further pulses from the pulses associated with the plurality of consecutive third time intervals.

9. The method of claim 8, wherein the step (f) further comprises
categorizing the pulses in the plurality of consecutive time third intervals based on pulse descriptor words (PDWs);
forming clusters of the pulses in the plurality of consecutive third time intervals based on the PDWs; and
extracting pulses from at least one of the formed clusters based on pulse repetition intervals (PRIs) between the extracted pulses.

10. The method of claim 9, wherein the step of extracting includes de-interleaving pulses from the at least one of the formed clusters using a Hough transform technique.

11. The method of claim 9, wherein the step of extracting included de-interleaving pulses from the at least one of the formed clusters using a pattern recognition technique.

12. A method of classifying radar emitters comprising the steps of:
(a) receiving pulses from multiple radar emitters during a plurality of consecutive first time intervals;
(b) forming a first snapshot of pulse descriptor words (PDWs) for the pulses received during a first time interval in the plurality of consecutive first time intervals;
(c) identifying PDWs corresponding to one or more pulse trains in the first snapshot using a first algorithm and removing the identified PDWs from the first snapshot;
(d) forming a second snapshot from the PDWs remaining in the first snapshot, the second snapshot corresponding to a second time interval longer than the first time interval; and
(e) identifying further PDWs corresponding to one or more pulse trains in the second snapshot using a second algorithm and removing the identified further PDWs from the second snapshot.

13. The method of claim 12, further comprising
(f) forming a third snapshot from the PDWs remaining in the second snapshot, the third snapshot corresponding to a third time interval longer than the second time interval; and
(g) identifying still further PDWs corresponding to one or more pulse trains in the third snapshot using a third algorithm and removing the identified still further PDWs from the third snapshot.

14. The method of claim 13, wherein the first snapshot is a 5 msec snapshot, the second snapshot is a 30 msec snapshot, and the third snapshot is an 80 msec snapshot.

15. The method of claim 13, wherein the step (e) comprises:
forming clusters of the PDWs in the second snapshot, and
extracting PDWs from at least one of the formed clusters based on pulse repetition intervals (PRIs) between the extracted PDWs as processed by the second algorithm; and
the step (g) comprises:
forming clusters of the PDWs in the third snapshot, and
extracting PDWs from at least one of the formed clusters in the third snapshot based on pulse repetition intervals (PRIs) between the PDWs extracted from the third snapshot as processed by the third algorithm.

16. A system for classifying radar emitters comprising
a receiver for receiving a plurality of signals from radar emitters,
a processor coupled to the receiver and configured for
(a) generating data components for each signal received from the radar emitters,
(b) forming multi-dimensional samples from the generated data components,
(c) placing the multi-dimensional samples corresponding to signals received during a first period into a first snapshot,
(d) extracting multi-dimensional samples from the first snapshot corresponding to one or more first pulse trains identified using a first algorithm,
(e) placing the multi-dimensional samples remaining in the first snapshot in a second snapshot corresponding to signals received during a second time frame longer than the first time frame, and
(f) extracting multi-dimensional samples from the second snapshot corresponding to one or more second pulse trains identified using a second algorithm.

17. The system of claim 16, wherein the processor is configured for de-interleaving multi-dimensional samples from the first snapshot using a quantized pulse repetition interval (PRI) technique.

18. The system of claim 16, wherein the processor is configured for de-interleaving multi-dimensional samples from the second snapshot using one of a differential time of arrival (DTOA) histogram technique, a spectrum estimation technique, or a pulse repetition interval (PRI) detection technique.

19. The system of claim 16, including
a storage device for storing the first and second snapshots representing the signals received.

* * * * *